United States Patent
Timmons et al.

(10) Patent No.: US 9,120,125 B2
(45) Date of Patent: Sep. 1, 2015

(54) PLASMA POLYMERIZATION FOR ENCAPSULATING PARTICLES

(71) Applicants: Richard B. Timmons, Arlington, TX (US); Ceren Susut, Arlington, VA (US)

(72) Inventors: Richard B. Timmons, Arlington, TX (US); Ceren Susut, Arlington, VA (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 14/068,575

(22) Filed: Oct. 31, 2013

(65) Prior Publication Data

US 2014/0053780 A1    Feb. 27, 2014

Related U.S. Application Data

(63) Continuation of application No. 10/931,480, filed on Sep. 1, 2004, now abandoned.

(51) Int. Cl.
*G01N 33/15*    (2006.01)
*B05D 1/00*    (2006.01)
*B01J 19/08*    (2006.01)
*C08F 2/00*    (2006.01)

(52) U.S. Cl.
CPC ............. *B05D 1/62* (2013.01); *B01J 19/088* (2013.01); *C08F 2/00* (2013.01); *B01J 2219/0809* (2013.01); *B01J 2219/0832* (2013.01); *B01J 2219/0841* (2013.01); *B01J 2219/0886* (2013.01)

(58) Field of Classification Search
CPC .... A61K 9/0024; A61K 9/7007; B01J 19/088
USPC .......................... 436/829; 422/186.1; 424/491
See application file for complete search history.

(56) References Cited

U.S. PATENT DOCUMENTS

| | | | |
|---|---|---|---|
| 4,935,661 A | 6/1990 | Heinecke et al. | |
| 5,244,730 A | 9/1993 | Nguyen et al. | |
| 5,288,504 A * | 2/1994 | Versic ........................... | 424/497 |
| 5,633,015 A | 5/1997 | Gilis et al. | |
| 5,693,340 A | 12/1997 | Harth et al. | |
| 5,876,753 A | 3/1999 | Timmons et al. | |
| 6,214,423 B1 | 4/2001 | Lee et al. | |
| 6,306,506 B1 | 10/2001 | Timmons et al. | |
| 6,329,024 B1 | 12/2001 | Timmons et al. | |
| 6,440,918 B1 | 8/2002 | France | |
| 6,482,531 B1 | 11/2002 | Timmons et al. | |
| 6,600,010 B2 | 7/2003 | Mao et al. | |
| 6,706,320 B2 | 3/2004 | Filippou et al. | |
| 6,712,997 B2 | 3/2004 | Won et al. | |
| 7,063,748 B2 | 6/2006 | Talton | |
| 7,250,195 B1 | 7/2007 | Storey et al. | |
| 7,749,229 B1 | 7/2010 | Bonutti | |
| 7,758,928 B2 | 7/2010 | Bunce et al. | |
| 2002/0106461 A1 | 8/2002 | Talton | |
| 2002/0145132 A1 | 10/2002 | Won et al. | |
| 2002/0155144 A1 * | 10/2002 | Troczynski et al. ........... | 424/423 |
| 2002/0187260 A1 | 12/2002 | Sheppard, Jr. et al. | |
| 2003/0113477 A1 | 6/2003 | Timmons et al. | |
| 2003/0148042 A1 | 8/2003 | Wang | |
| 2005/0136114 A1 | 6/2005 | Kulkarni et al. | |
| 2005/0228111 A1 | 10/2005 | Furuzono et al. | |
| 2005/0276835 A1 | 12/2005 | Lahann et al. | |
| 2006/0045822 A1 | 3/2006 | Timmons et al. | |
| 2007/0104860 A1 | 5/2007 | Gleason et al. | |
| 2007/0116910 A1 | 5/2007 | Polykarpov et al. | |
| 2009/0011007 A1 | 1/2009 | Meier et al. | |
| 2009/0099282 A1 | 4/2009 | Muller et al. | |

FOREIGN PATENT DOCUMENTS

| | | |
|---|---|---|
| EP | 1426031 A1 | 9/2004 |
| JP | 2000-143230 A | 5/2000 |
| JP | 2005179661 | 7/2005 |
| KR | 20050054349 A | 6/2005 |
| KR | 20060036342 A | 4/2006 |
| KR | 20070040173 A | 4/2007 |

OTHER PUBLICATIONS

International Search Report and Written Opinion of KIPO for PCT/US2009/037199 dated Oct. 28, 2009.
Extended European Search Report for EP 09720278.2 dated Mar. 21, 2013.
International Search Report for PCT/US2010/035872 dated May 13, 2011.
International Search Report and Written Opinion for PCT/US2010/035869 dated May 13, 2011.
Brown, et al., "Acceptable Analytical Practices for Dissolution Testing of Poorly Soluble Compounds," Pharmaceutical Technology, (Dec. 2004), pp. 56-65.
Dressman, et al., "The BCS: Where Do We Go from Here?" Pharmaceutical Technology, (2001), 25(7):68-76.
Mahlberg, R., et al, "Effect of osygen and hexamethyldisiloxane plasma on morphology, wettability and adhesion properties of polypropylene and lignocellulosics," International Journal of Adhesion, 62 Adhesives 18, 1998, pp. 283-297.
Nguyen, M. Hong, et al, "Voriconazole against fluconazole-susceptible and resistant candida isolates: in-vitro efficacy compared with that of itraconazole and ketoconazole," Journal of Antimicrobial Chemotherapy, 1998, 42:253-256.
Susut, C., et al., "Plasma Enhanced Chemical Vapor Depositions to Encapsulate Crystals in Thin Polymeric Films: a New Approach to Controlling Drug Release Rates," International Journal of Pharmaceutics, (2005), 288:253-261.

(Continued)

*Primary Examiner* — Natalia Levkovich
(74) *Attorney, Agent, or Firm* — Meyertons, Hood, Kivlin, Kowert & Goetzel, P.C.; Eric B. Meyertons

(57) ABSTRACT

The present invention includes systems, methods and compositions for the encapsulation of particles. In one form, the system comprises one or more particles, a rotatable reaction chamber in a plasma enhanced chemical reactor to accept one or more particles, and at least one carbonaceous compound to be used in the rotatable reaction chamber, wherein the carbonaceous compound is polymerized onto a surface of one or more particles forming a polymer film encapsulating one or more particles. Using systems, methods, and compositions of the present invention, any particle encapsulated with a degradable or nondegradable polymer film may be introduced and/or released into an environment. The polymer film as well as introduction of encapsulated particles and release therefrom into an environment are controlled by the present invention.

15 Claims, 18 Drawing Sheets

(56) References Cited

OTHER PUBLICATIONS

The Penguin Dictionary of Science, "supersaturated solution," 2009, http://www.credoreference.com/entry/penguinscience/supersaturated_solution.

Wu, Chi-Yuan, et al, "Predicting Drug Disposition via Application of BCS: Transport/Absorption/Elmination Interplay and Development of a Biopharmaceutics Drug Disposition Classification System," Pharmaceutical Research, vol. 22, No. 1, 2005, pp. 11-23.

* cited by examiner

FIG. 2
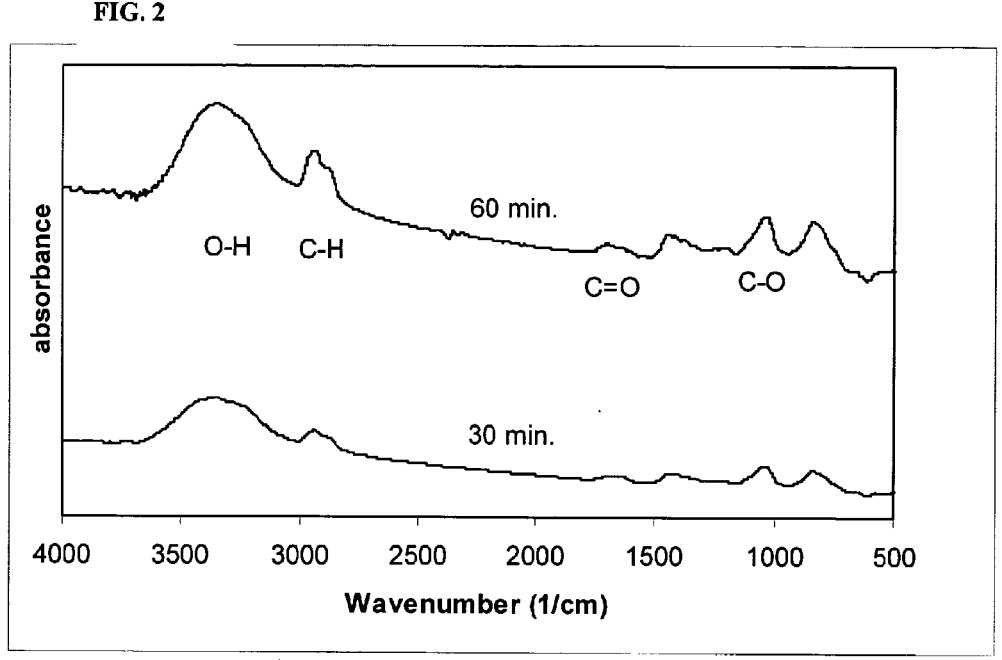
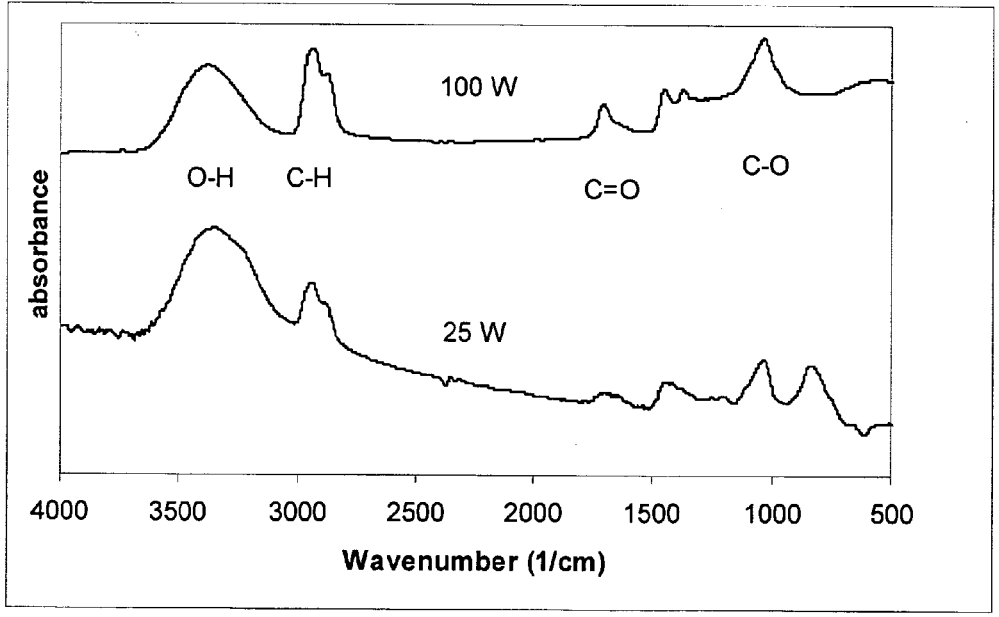
FIG. 3

FIG. 4
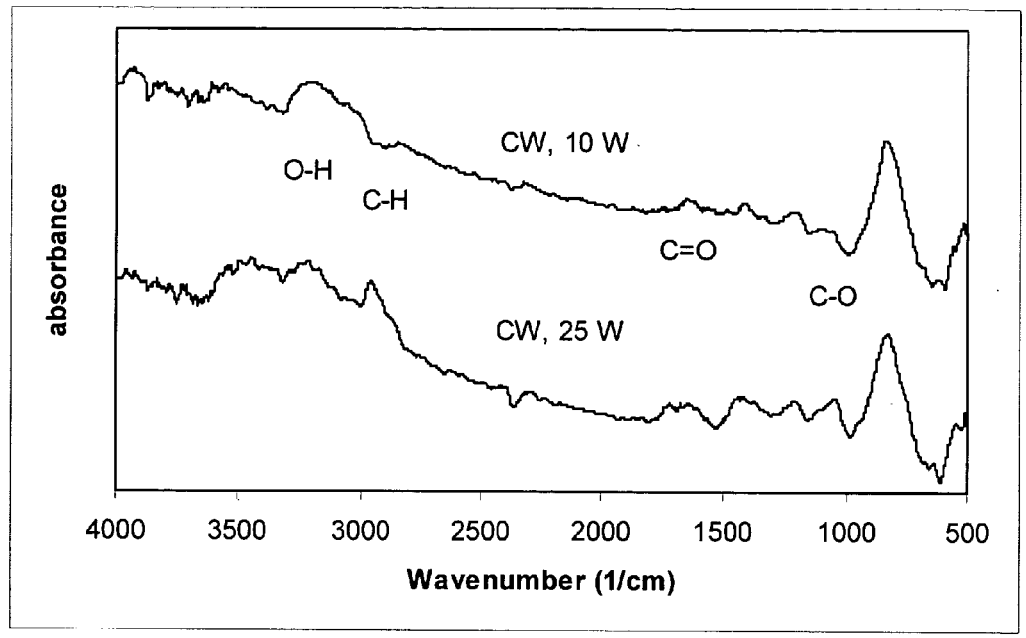
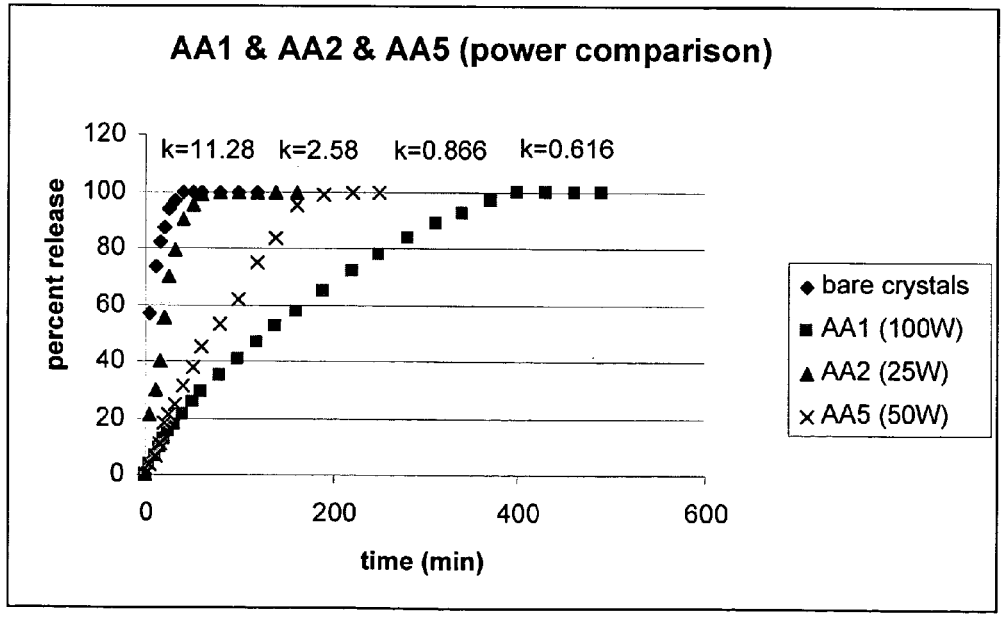
FIG. 5

FIG. 6
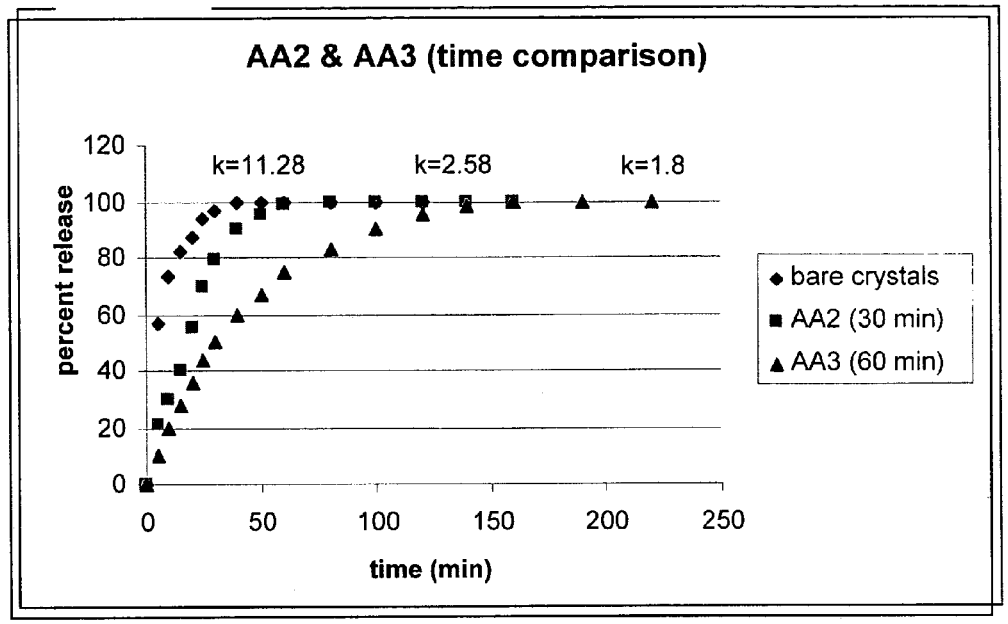
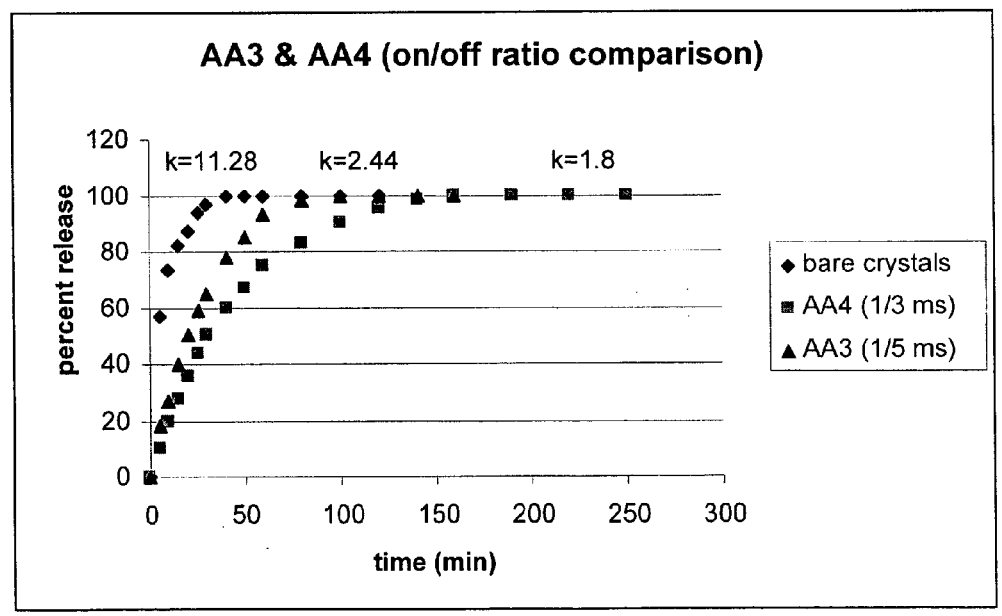
FIG. 7

FIG. 8
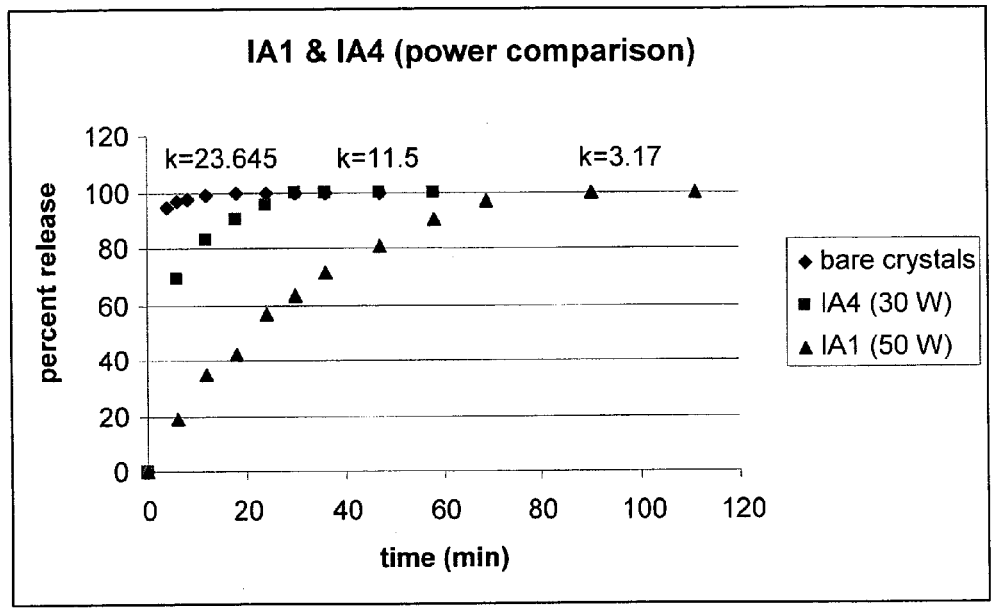
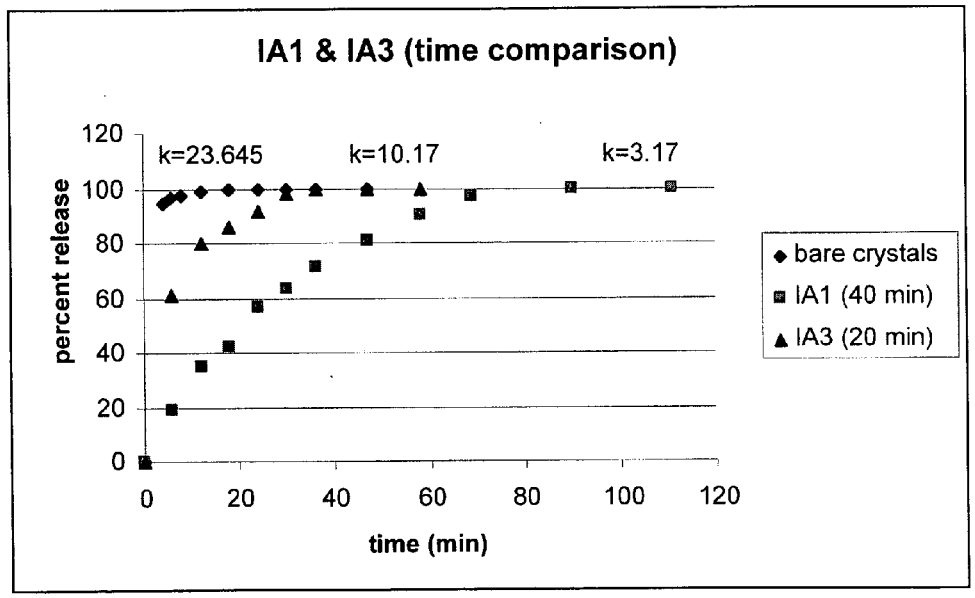
FIG. 9

FIG. 10
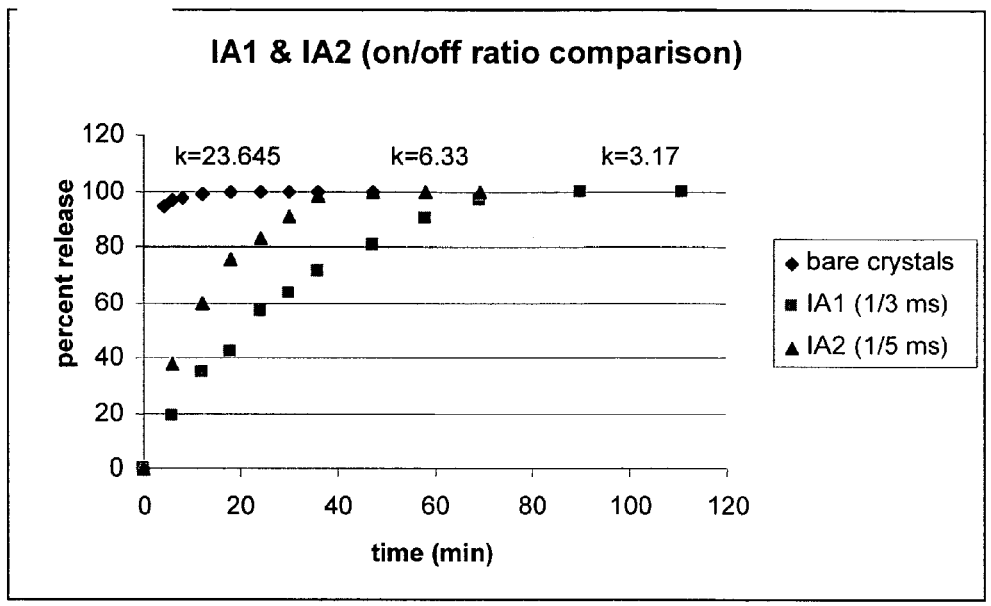
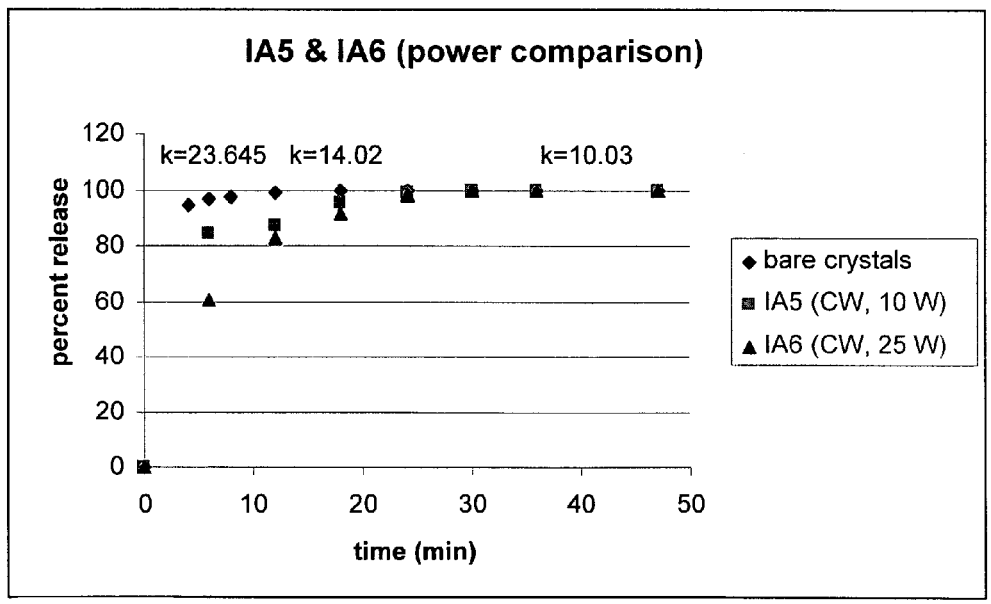
FIG. 11

FIG. 12
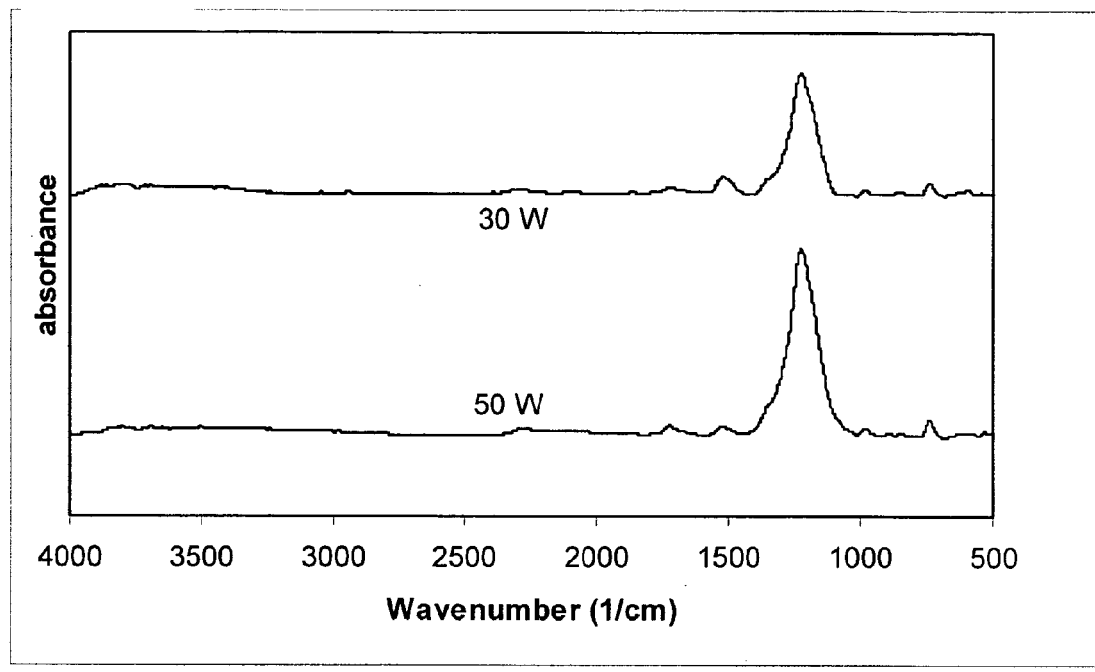
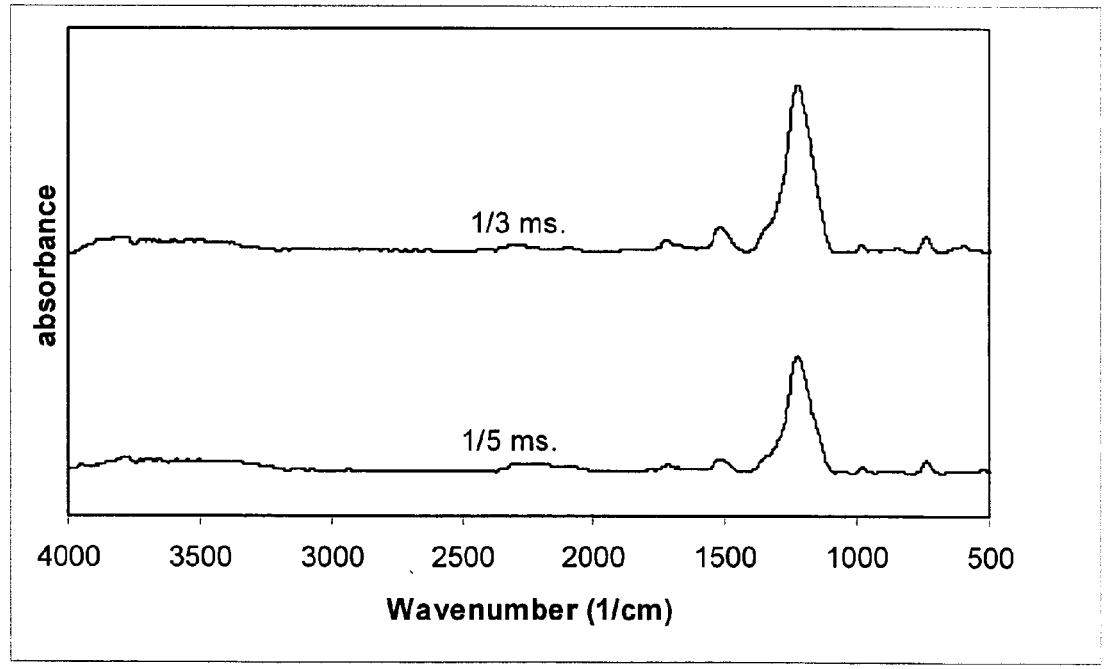
FIG. 13

FIG. 14
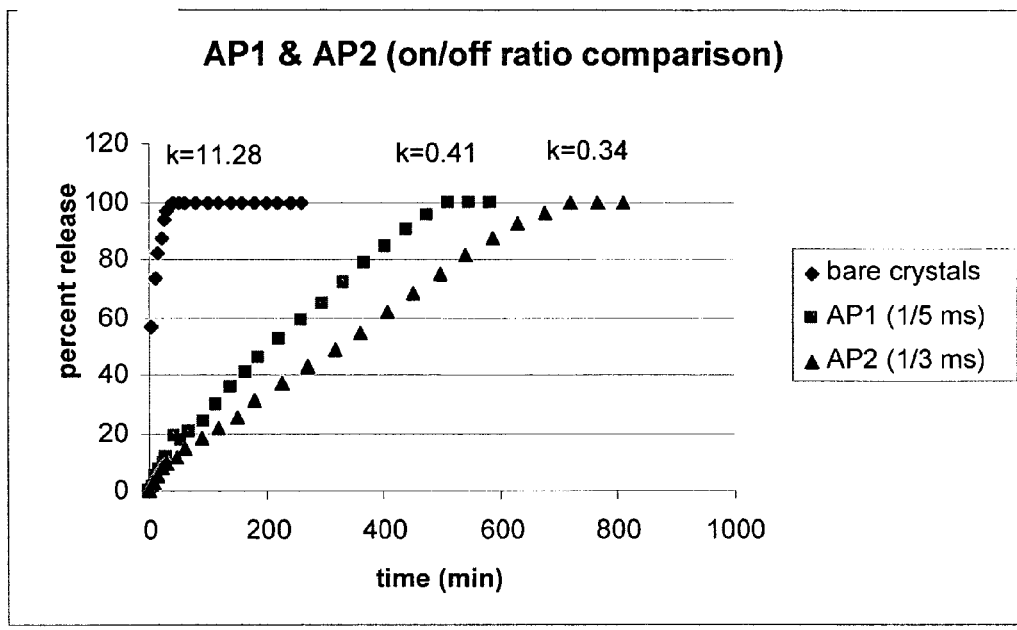
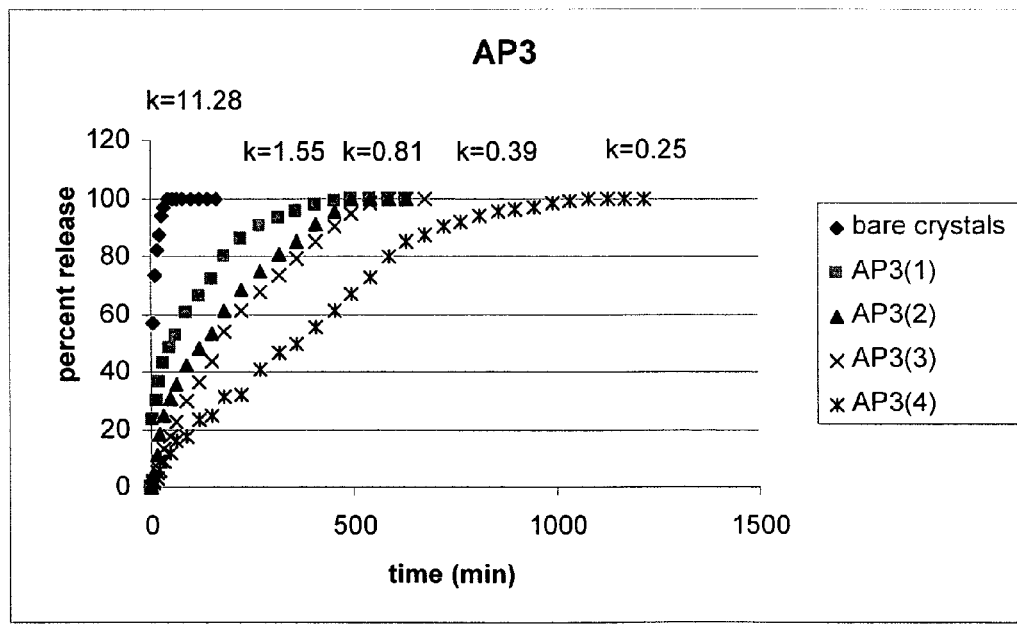
FIG. 15

FIG. 16
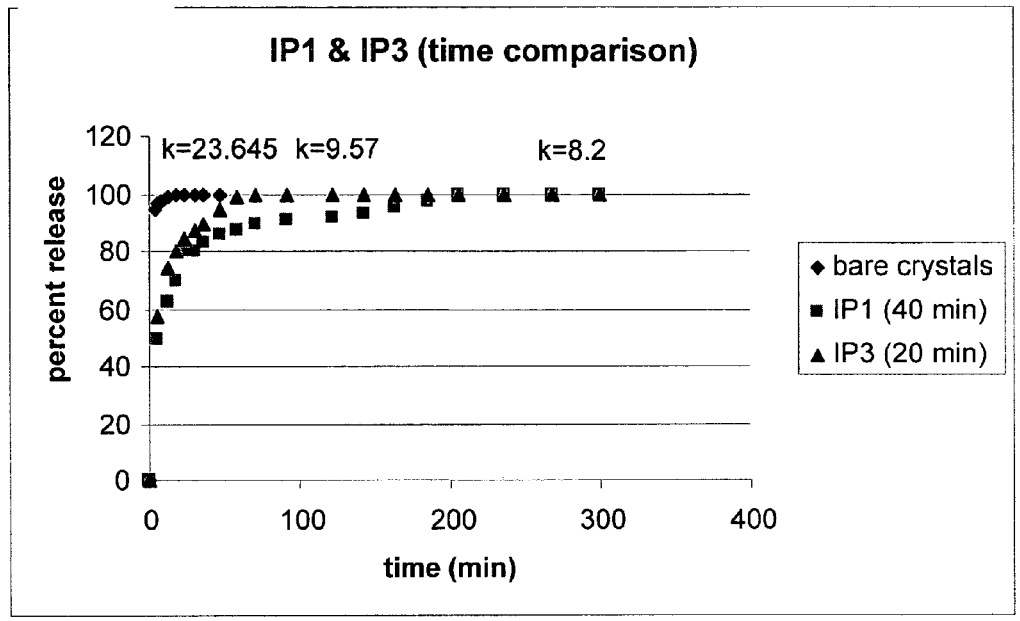
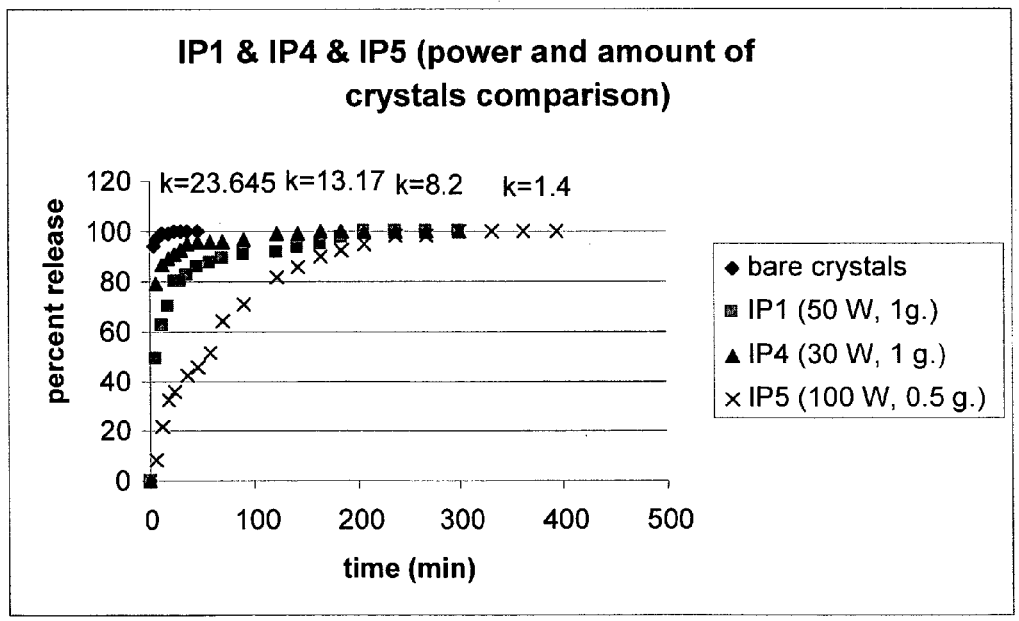
FIG. 17

FIG. 18
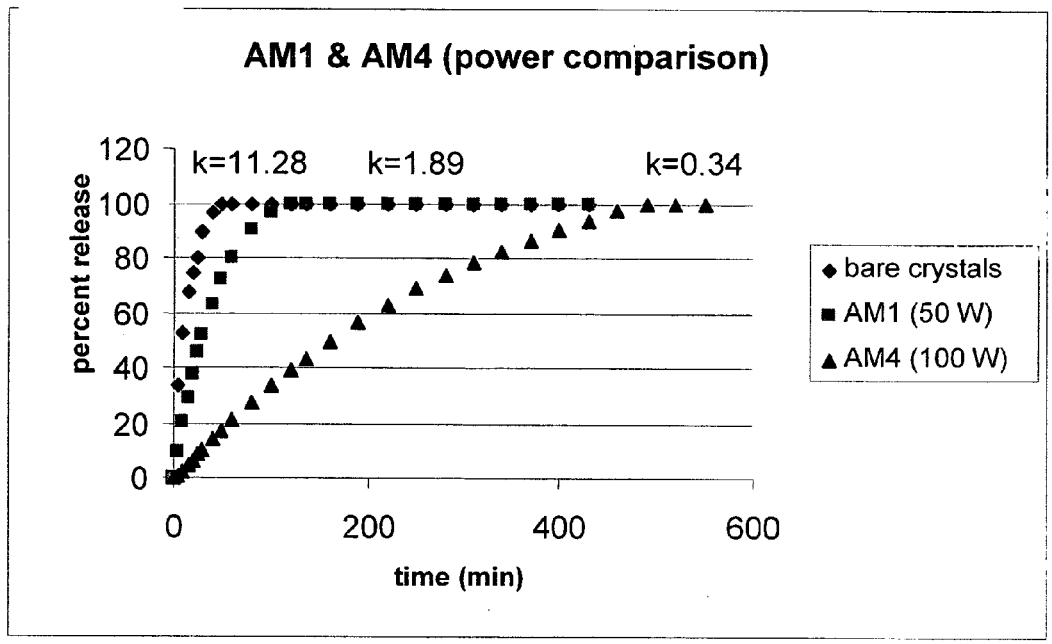
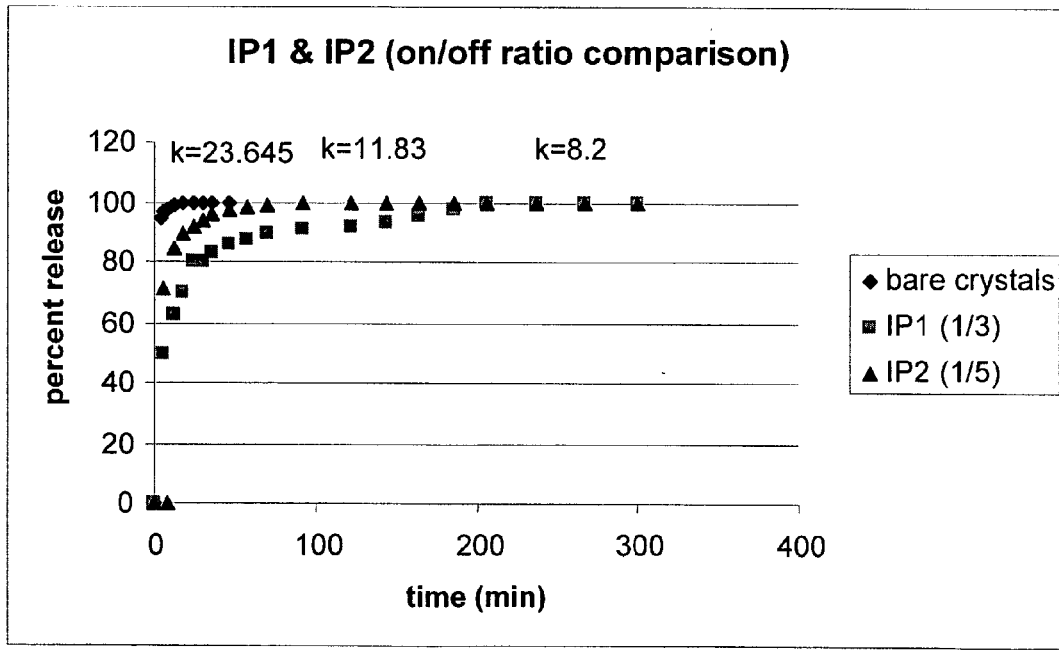
FIG. 19

FIG. 22
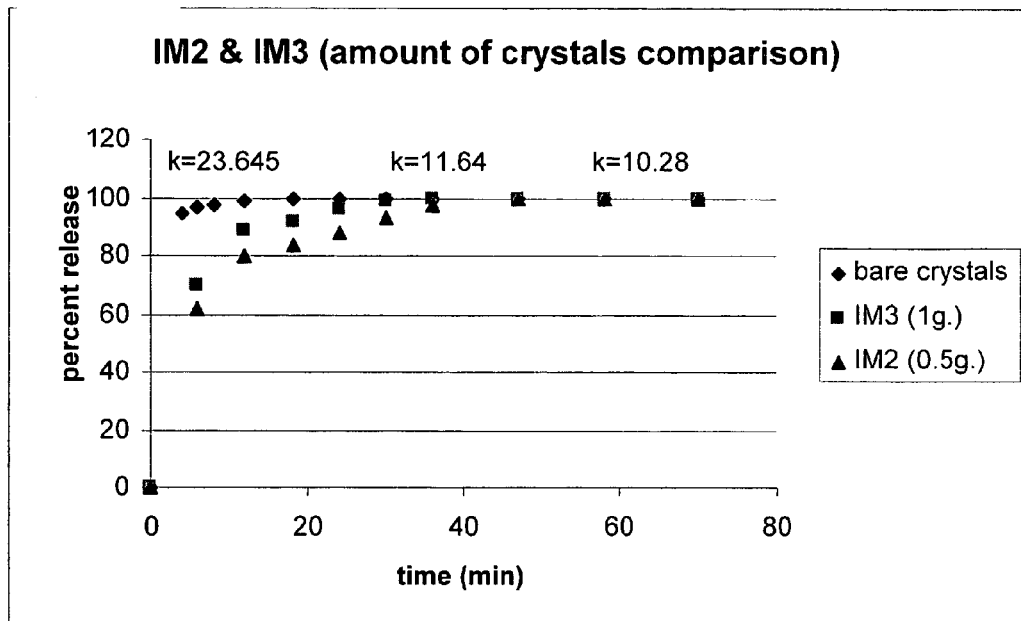
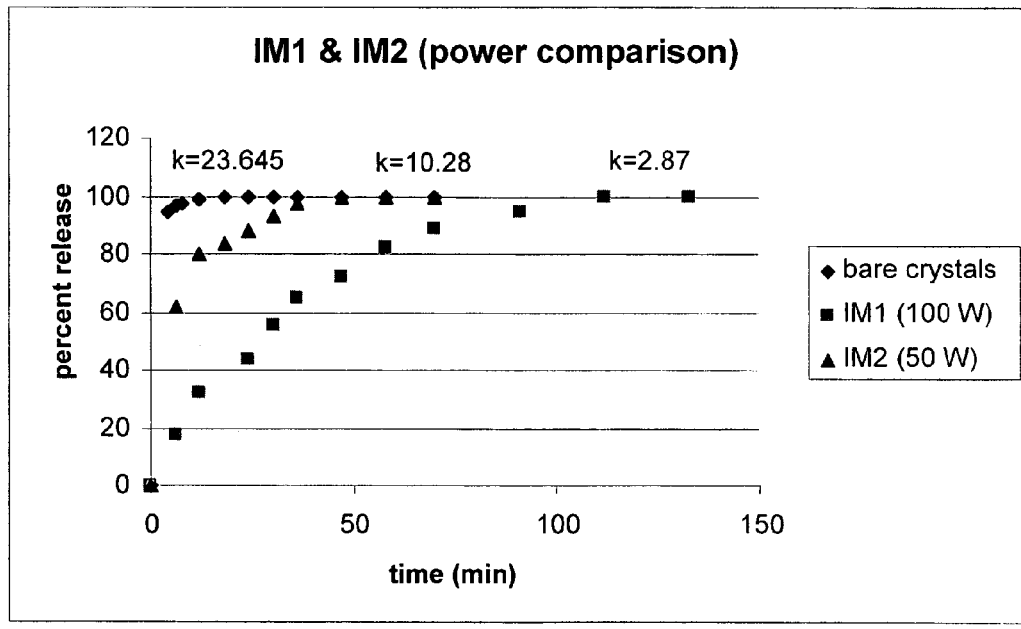
FIG. 23

FIG. 29
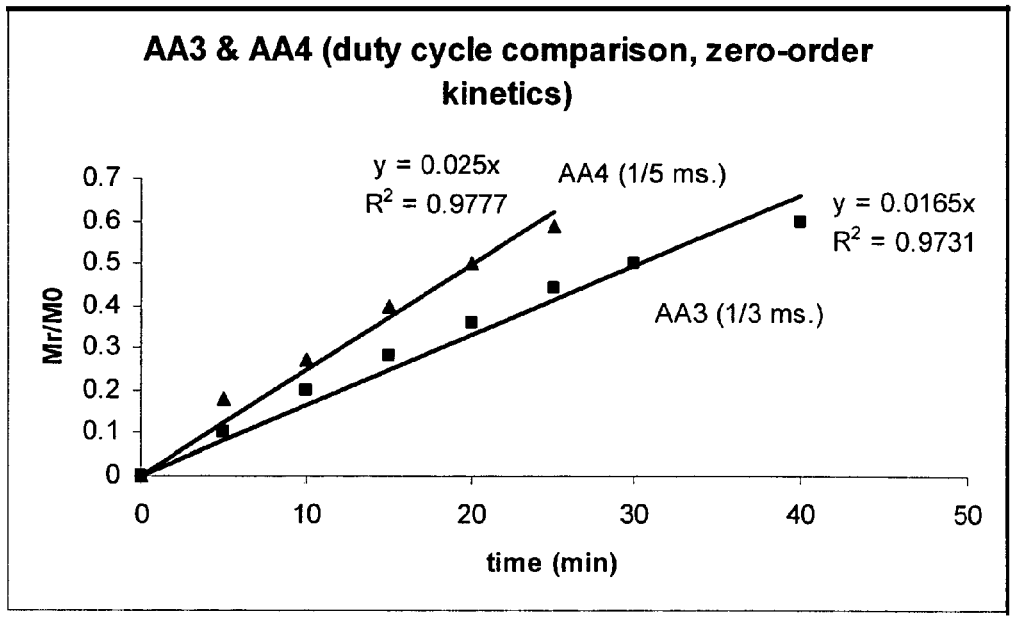
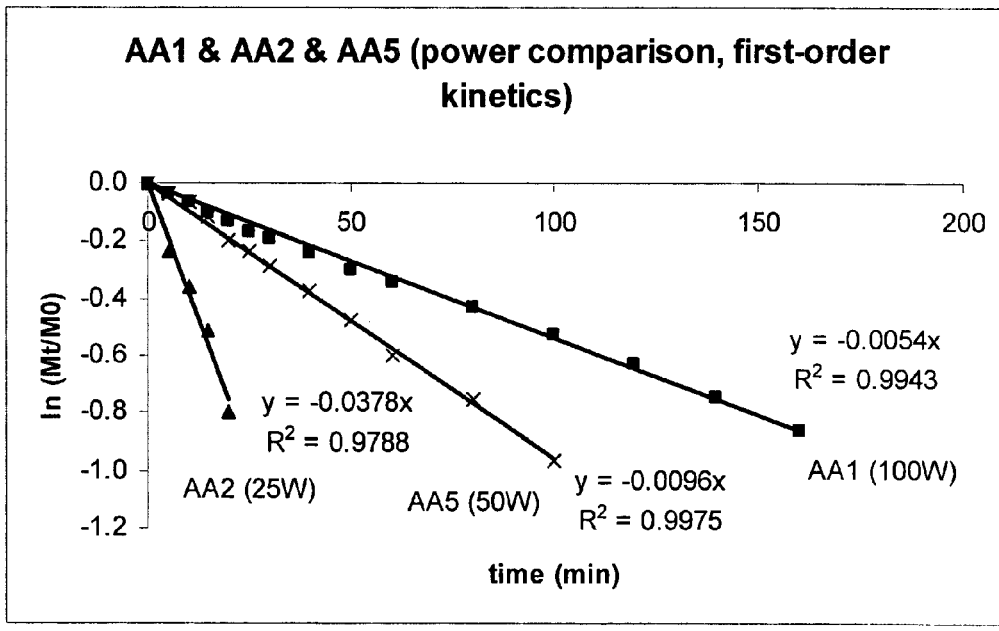
FIG. 30

PLASMA POLYMERIZATION FOR ENCAPSULATING PARTICLES

CROSS-REFERENCE TO RELATED APPLICATION

This application is a Continuation of U.S. patent application Ser. No. 10/931,480 filed Sept. 1, 2004, the content of which is incorporated by reference herein its entirety.

STATEMENT OF FEDERALLY FUNDED RESEARCH

None

REFERENCE TO A SEQUENCE LISTING

None

BACKGROUND OF THE INVENTION

The present invention relates to the encapsulation of particles, and more specifically to particle encapsulation using a plasma polymerization process.

Particle encapsulation, in which a particle is surrounded or coated by at least one layer of a surface, has many beneficial uses. Unfortunately, current methods of encapsulation generally require a number of technical steps and result in encapsulated products with poor stability. In addition, most methods result in low product yields, due, in part, to the limited tolerance of the starting materials to industrial operating conditions and the numerous technical difficulties associated with the encapsulation process, with product recovery and inadequate recycling from the reaction systems.

Particle encapsulation, for example, offers a method in which a particle may be introduced to an environment in a more controlled manner. The control is generally imposed by varying different aspects of the coating, such as its composition. Such control generally falls into one of two categories: temporal control and distribution control. Temporal control introduces the particle to the environment over an extended time period or at a pre-specified time. Here, the aim is to match the rate of particle introduction to the rate of particle elimination from the environment. Thus, the particle concentration appears to be regulated and often for a much longer time. This technique is particularly beneficial when introducing a particle into a biologic system for therapeutic purposes, because the overall therapeutic index is improved.

Distribution control, on the other hand, provides for the introduction of a particle at at least one specific environmental location. Such control may be desired when the particle is not required or presents/encounters problems when introduced to the entire environment. In biologic systems, distribution control may reduce or eliminate the occurrence of undesirable side effects.

Current approaches to particle encapsulation include layer-by-layer assembly of polyelectrolytes, emulsion-solvent evaporation processes, formation of hydrogel films, and the preparation of systems based on thiolated polymers, sol-gel carriers, and granulation techniques. While current approaches do provide satisfactory results for introducing particles to an environment; these approaches are complex, involve a number of technical steps, generate large amounts of waste products, and are often inadequate in truly controlling the introduction of the particle into the environment.

Clearly, then, there remains a need to provide for more efficient compositions, systems and methods for introducing particles to an environment in which the particle introduction may be better controlled temporally and/or site-specifically.

SUMMARY OF THE INVENTION

The present invention solves the current problem associated with inefficient systems and methods of introducing particles to an environment. The present invention provides for a novel plasma polymerization approach for controlling the introduction and release of a particle to an environment.

Generally, and in one form, the present invention provides for the encapsulation of one or more particles using plasma enhanced chemical vapor depositions (PECVD). The PECVD coats particles with at least one layer of a coating material. PECVD is capable of controlling coating of the particle. In addition, the coating material controls particle introduction into an environment. The coating material and, hence, control of particle introduction into an environment, is dependent on the encapsulation process as well as the composition of the coating of the present invention. In one embodiment, the coating material is a polymeric film comprising at least one carbonaceous compound. The carbonaceous compound is a degradable or nondegradable carbon-containing compound capable of being polymerized on a surface of a particle and, as such, encapsulating the particle.

The present invention also provides for a system for encapsulating one or more particles comprising one or more particles, a rotatable reaction chamber in a plasma enhanced chemical reactor to accept one or more particles, and at least one carbonaceous compound to be used in the rotatable reaction chamber, wherein the carbonaceous compound is polymerized onto a surface of one or more particles forming a polymer film encapsulating one or more particles. The particle may be a pharmaceutical composition (e.g., drug), food, semiconductor material, amino acid, protein, carbonaceous compound, nucleic acid, vitamins, mineral, elemental molecule, fatty acid, lipid, photolabile compound, as examples. The carbonaceous compound is a carbon-containing monomer capable of polymerizing into a degradable or nondegradable polymer.

Reaction conditions that promote polymerization and/or encapsulation generally include power input, peak power, coating time, duty cycle, flow rate of the carbonaceous compound, reactor pressure, and quantity of particles. By altering one or more of the reaction conditions, polymerization is controlled. By controlling polymerization, one can ultimately control the release and rate of release of the encapsulated constituents into an environment. Aspects of the coating or polymer film that may be controlled include film growth, thickness, number, density and quality of one or more monomeric functional groups, hydrophilicity or hydrophobicity, wettability, linearity, cross-linking, and various combinations thereof.

In another form, the present invention is a method for encapsulating one or more particles comprising the step of polymerizing a carbonaceous compound onto a surface of one or more particles to form a polymer film encapsulating one or more particles, wherein the carbonaceous compound is polymerized in a rotatable reaction chamber of a plasma reactor using radio frequency power.

In still another form, the present invention provides for methods and systems for controlling release of one or more particles into an environment, the system comprising one or more particles, a rotatable reaction chamber in a plasma enhanced chemical reactor to accept one or more particles, and at least one carbonaceous compound to be used in the rotatable reaction chamber, wherein the carbonaceous compound is polymerized onto a surface of one or more particles forming a polymer film encapsulating one or more particles, and wherein reaction conditions used in the rotatable reaction chamber control polymer film formation and release of one or more particles into the environment. Particles are released from the encapsulating polymer film by a number of processes that include dissolution of the particle, degradation of the polymer film, and/or passage of the particle through the polymer film.

In yet another form the present invention provides for compositions prepared by systems and methods of the present invention. Compositions include organic and inorganic compositions, such as pharmaceutical compositions, as examples.

Those skilled in the art will further appreciate the above-noted features and advantages of the invention together with other important aspects thereof upon reading the detailed description that follows in conjunction with the drawings.

BRIEF DESCRIPTION OF THE DRAWINGS

For more complete understanding of the features and advantages of the present invention, reference is now made to the detailed description of the invention along with the accompanying figures, wherein:

FIG. 2 depict FT-IR absorption spectra obtained for pulsed plasma polymerization of allyl alcohol at $1/5$ ms/ms and peak powers of 100 W and 25 W;

FIG. 3 depict FT-IR absorption spectra obtained for pulsed plasma polymerization of allyl alcohol at $1/5$ ms/ms and 25 W for coating times of 60 and 30 minutes;

FIG. 4 depict FT-IR absorption spectra obtained for CW plasma polymerization of allyl alcohol at powers of 10 W and 25 W;

FIG. 5 depict release rates of acetylsalicylic acid coated with of polyallylalcohol as a function of power input;

FIG. 6 depict release rates of acetylsalicylic acid coated with polyallylalcohol as a function of coating time;

FIG. 7 depict release rates of acetylsalicylic acid coated with polyallylalcohol as a function of plasma duty cycle employed during coating;

FIG. 8 depict release rates of ibuprofen coated with polyallylalcohol as a function of power input, all other plasma variables held constant;

FIG. 9 depict release rates of ibuprofen coated with polyallylalcohol as a function of coating times, all other plasma variables held constant;

FIG. 10 depict release rates of ibuprofen coated with polyallylalcohol as a function duty cycles, all other plasma variables held constant;

FIG. 11 depict continuous wave plasma polymerization of allyl alcohol with different power input values;

FIG. 12 depict FT-IR absorption spectra obtained for plasma polymerization of perfluorohexane at $1/3$ ms/ms and peak powers of 30 W and 50 W;

FIG. 13 depict FT-IR absorption spectra obtained for plasma polymerization of perfluorohexane at 50 W and duty cycles of $1/3$ ms/ms and $1/5$ ms/ms;

FIG. 14 depict release rates of acetylsalicylic acid coated with polyperfluorohexane as functions of duty cycles;

FIG. 15 depict release rates of acetylsalicylic acid coated with polyperfluorohexane as a function of coating time and amount of crystals coated in each run;

FIG. 16 depict release rates of ibuprofen coated with polyperfluorohexane as functions of power input and amount of crystals coated;

FIG. 17 depict release rates of ibuprofen coated with polyperfluorohexane as a function of coating times;

FIG. 18 depict release rates of ibuprofen release coated with polyperfluorohexane a function of duty cycles;

FIG. 19 depict release rates of acetylsalicylic acid coated with polymethylmethacrylate as a function of power input;

FIG. 22 depict release rates of ibuprofen coated with polymethylmethacrylate as a function of power input;

FIG. 23 depict release rates of ibuprofen coated with polymethylmethacrylate as a function of amount of crystals coated in each run;

FIG. 29 depicts zero-order release kinetics of acetylsalicylic acid coated with polyallyl alcohol as a function of plasma duty cycle;

FIG. 30 depicts first-order release kinetics of acetylsalicylic acid coated with polyallyl alcohol as a function of peak power;

DETAILED DESCRIPTION OF THE INVENTION

Figure 1:
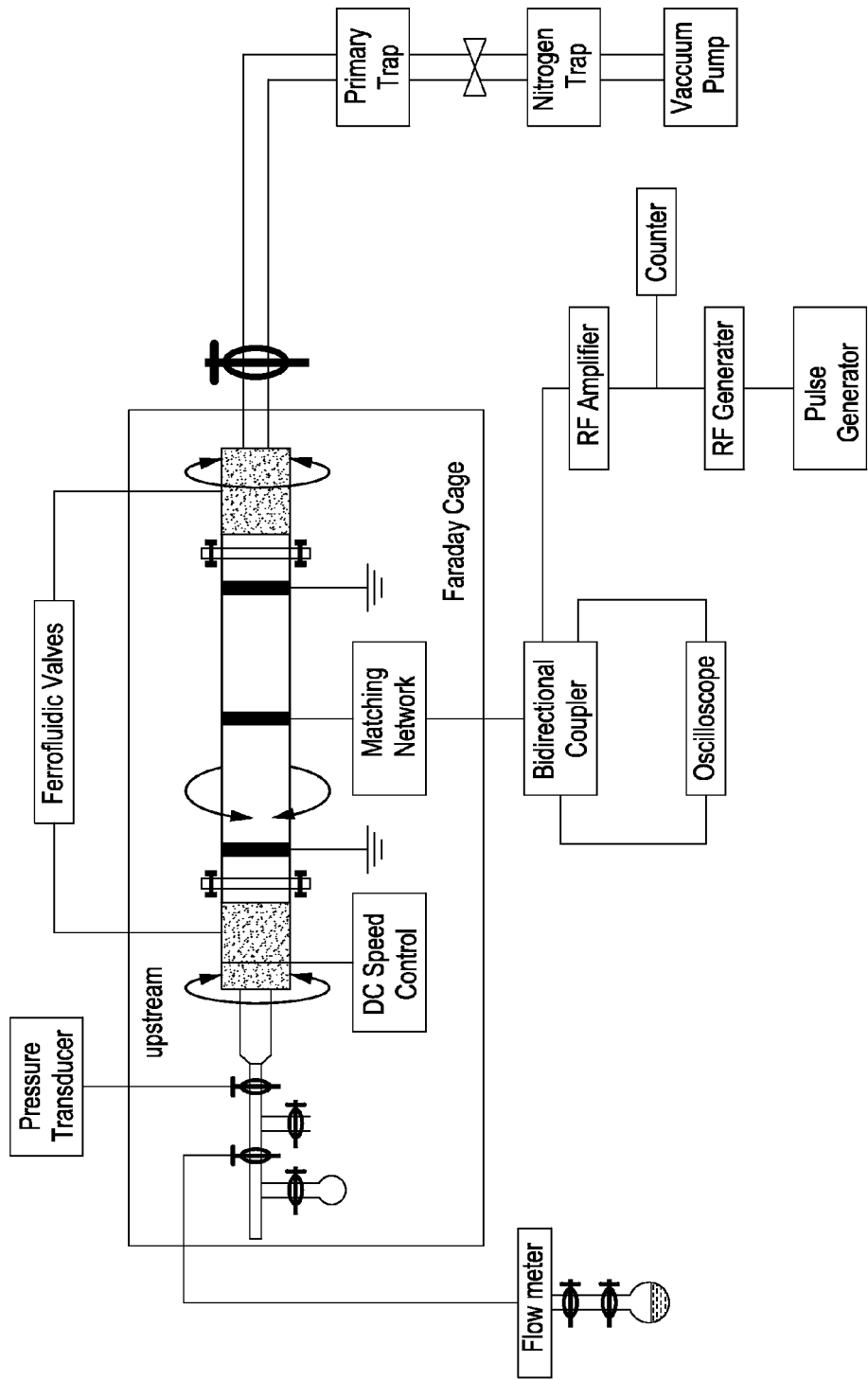
FIG. 1 depicts a schematic diagram of a plasma reactor in accordance with one aspect of the present invention.

Although making and using various embodiments of the present invention are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention.

In the description which follows like parts may be marked throughout the specification and drawing with the same reference numerals, respectively. The drawing figures are not necessarily to scale and certain features may be shown exaggerated in scale or in somewhat generalized or schematic form in the interest of clarity and conciseness.

Discovering new and improved techniques for particle encapsulation has become one of today's fastest growing areas of research. While many of these techniques have biologic, chemical, and pharmaceutical applications, other applicable fields include electronics, the food industry, optics, data management, agriculture, and material sciences, as examples. In general, the primary purpose of encapsulation is to be able to control and/or delay particle release into the environment. In the pharmaceutical and medical device industry, another purpose for particle encapsulation is to improve particle effectiveness when introduced into a biologic system and to reduce any negative consequences associated with introduction of the particle. In addition, the encapsulated constituents (e.g., particle) should reduce costs associated with its introduction, e.g., reduce dosing, reduce administration of concomitant agents or particles, and reduce the necessity for specialized personnel and/or equipment. The present invention is capable of accomplishing these and other tasks as is further described below.

Coating Material

Coating materials of the present invention are used to prepare coatings that encapsulate particles of the present invention. Coating materials are monomers or carbonaceous compounds (molecules containing at least one carbon) that, upon polymerization (e.g., by deposition), yield polymers or polymer films that are degradable or nondegradable. In many instances, monomers are carbonaceous compounds capable of forming at least one polymer or polymer film degradable by chemical and/or physical processes. Degradation of the polymer or polymer film is then dependant, in part, on the encapsulation process, as described herein. Monomers are also carbonaceous compounds capable of forming at least one polymer or polymer film that is not degradable. As such, the encapsulating polymer or polymer film is capable of releasing the particle via one or more processes, such as dissolution of all or a portion of the particle, chemical degradation of the encapsulating polymer, physical degradation of the encapsulating polymer, and/or passage of the all or a portion of the particle through the polymer (e.g., through pores, spaces, or openings in the polymer or polymer film). Release of a particle encapsulated by such a degradable or nondegradable polymer is also dependent, in part, on the encapsulation process, as described herein.

Degradable polymers include natural polymers (e.g., polysaccharides) as well as synthetic polymers, which are easy to manipulate (e.g., polyesters, polyanhydrides, polyamides, phosphorous-containing polymers). Examples of degradable coatings or polymer films prepared by the present invention are listed in TABLE 1. The coating materials that form such coatings or polymers are the monomeric subunits. Examples of these monomeric subunits include ethylene, vinyl alcohol, acrylic acid, carbophil, ethylene glycol, glycolic acid, saccharide, lactic acid, esters, ortho esters, phosphazenes, anhydrides, amides, as examples.

TABLE 1

Coating materials of the present invention.

| Backbone Structure | Coating Material | Comments |
|---|---|---|
| C—C | Polyethylene (PE) | Zero-order temporal control achieved by diffusion from matrices. |
| Vinyl-based C—C | Poly(vinyl alcohol) (PVA) | Bioadhesive hydrogels. Surface stabilizer in microsphere formulation. |
|  | Poly(acrylic acid) (PAA) | Bioadhesive polymer. Hydrogels of PAA reversibly swell as a function of pH. |
|  | Polycarbophil | Hydrogels. Mucoadhesive properties allow temporal and distribution control. |
| C—O | Polyethylene glycol (PEG) | Used as diffusion-limited tablet formulation, cross-linked hydrogels and polymer conjugates. |
| C—O, C=O | Poly(glycolic acid) (PGA) Poly(lactic acid) (PLA) | Biosynthetic poly(esters) used in the formulation of matrices containing human growth hormone. |
|  | Poly(ortho esters) | Degradable polymers. Number of applications of 3,9-diethylidene-2,4,8,10-tetraoxaspiro[5.5]undecane (DETOSU)-based poly(ortho esters). |
|  | Poly(anhydrides) | Heterogeneous surface erosion. Polyanhydride matrices used in microencapsulation of insulin, enzymes and growth factors. |
| Phosphorous-based P=N, P—O | Poly(phosphazenes) | Amino acid side chains generate flexible materials that degrade to amino acid, phosphate and ammonia poly[bis(glycine ethyl ester)phosphazene]. |

A degradable polymer generally releases its encapsulated particle into an environment through a process that includes degradation of the encapulating polymer. A degradable polymer, as with a nondegradable polymer, may also have pores, spaces, or openings through which all or portions of the particle may pass.

Degradation of a degradable polymer generally occurs via bond cleavage and/or erosion. For biologic systems, degradation often occurs via enzymatic cleavage or hydrolysis, in which the polymer backbone is cut using a chemical process. With erosion, a physical process occurs, generally involving surface erosion or bulk erosion.

One feature of the present invention is that degradation of a polymer or polymer film may be controlled. Similarly, the present invention is capable of controlling other characteristics of a polymer or polymer film that affect particle release. Hence, the present invention is capable of controlling the release of a particle into an environment. Such control occurs because the present invention is capable of altering one or more conditions of the polymer or polymer film. Coating conditions include altering the surface area of a coating, adjusting the cross-linking of the coating material, altering the wetness, hydrophilicity or hydrophobicity of the coating, changing the density of side groups or functional groups in the coating or coating material, and/or altering the overall thickness of the coating. These coating conditions may be altered for an encapsulation process involving degradable and/or nondegradable polymers. In some instances, encapsulation may include more than one polymer.

In one aspect of the present invention, coating materials such as allyl alcohol, perfluorohexane ($C_6F_{14}$) and methylmethacrylate are provided. Coatings or polymer films obtained by plasma polymerization of allyl alcohol and methyl methacrylate are hydrophilic. Coatings or polymer films obtained by plasma polymerization of perfluorohexane are hydrophobic. Chemical structures of (a) allyl alcohol, (b) perfluorohexane, and (c) methyl methacrylate are shown below.

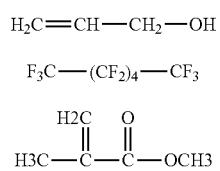

With the present invention, the carbonaceous compound may be pretreated before use. For allyl alcohol—an oxygen containing organic monomer that is very soluble at pHs ranging from 1 to 10—as well as perfluorohexane ($C_6F_{14}$)—a perfluorocarbon compound that is sparingly soluble at pHs ranging from 1 to 10—the compounds were degassed by freeze-thaw cycles before use. A similar procedure was also performed for methyl methacrylate. Each carbonaceous compound is also handled in the proper manner based on its chemical composition, as is well known in the art. For examples, allyl alcohol and perfluorohexane were protected from light and stored at room temperature, while methyl methacrylate was protected from light and stored in the refrigerator at 4 degrees Centigrade.

Perfluorocarbon compounds, such as perfluorohexane, yield plasma polymerized fluorinated films that exhibit good adhesion to many organic and inorganic substrates, have low intermolecular forces, low friction coefficient, and are biocompatible. The present inventors have previously shown that a pulsed plasma polymerization process may be used with perfluorocarbon compounds to create polymers and polymers films. (See U.S. Pat. Nos. 5,876,753; 6,306,506; 6,214,423; all of which are herein incorporated by reference) Polymers of hexafluoropropylene oxide ($C_3F_6O$), perfluoro-2-butyltetrahydrofuran (PF2BTHF, $C_8F_{16}O$) and perfluoropropylene ($C_3F_6$) create excellent coatings or films that are capable of attaching to substrate surfaces.

Particles

Particles of the present invention are organic or inorganic molecules that may be surrounded or coated by at least one layer of a coating material. Generally, preferred particles are those that remain functional after coating. Functional particles may undergo some structural alteration(s) during coating; however, their general function remains. Particles may include pharmaceutical compositions (e.g., drugs), food, semiconductor materials, proteins, carbonaceous compounds, nucleic acids, vitamins, minerals, elemental molecules, fatty acids, lipids, photolabile compounds, as examples.

In various embodiments, a pharmaceutical composition, for example aspirin and/or ibuprofen, may be used as the particle. Aspirin, chemically referred to as acetyl salicylic acid, is an antipyretic, anti-inflammatory analgesic with a carboxylic acid backbone group rendering the molecule soluble in various solvents. Acetyl salicylic acid, shown below as structure (d), may be detected by UV-visible spectroscopy and is available in crystal form. While uniformly sized particles may be used with the present invention, it is not necessary. In some instances, particles of different sizes may be preferred. For crystals such as aspirin, uniformity may be obtained by grinding and sieving the crystals followed by drying under vacuum (e.g., 100 degrees Centigrade overnight).

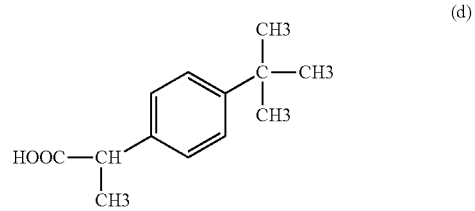

Ibuprofen, chemically referred to as 4-isobutyl-α-methylphenylacetic acid, is an acidic, non-steroidal, anti-inflammatory composition with limited solubility in low pH (<7) solutions and high solubility at higher pH (>7) solutions. Ibuprofen has a carboxylic acid backbone group as shown in structure (e) and may be detected by UV-visible spectroscopy. For ibuprofen, crystals were sieved and used without drying.

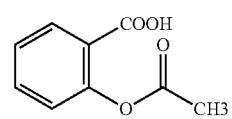

Plasma Enhanced Chemical Vapor Depositions (PECVD)

PECVD provides for a solventless, pin-hole free, single-step encapsulation process in which the encapsulating or coating material may be modified depending on the process, itself. For example, the process is able to control encapsulation, and hence, particle introduction into an environment, by adjusting the side groups, thickness, wetness, surface area and/or composition of the coating material.

With the present invention, both pulsed and the more conventional continuous-wave (CW) plasma approaches may be used. For example, the present inventors have shown that using a pulsed plasma approach provides excellent film chemistry control during polymer formation and control of film thickness (Susut C and Timmons R B, Plasma enhanced chemical vapor depositions to encapsulate crystals in thin polymeric films: a new approach to controlling drug release rates, International Journal of Pharmaceutics, 2004, in press; herein incorporated by reference). Pulsed applications may limit undesirable plasma-induced chemical changes to particles. In addition, under pulsed reaction conditions, significant film formation occurs during plasma off periods (and undesirable high energy reactions between ion-radical and particle are minimized).

Sample Reaction Conditions Using a Pulsed Radio Frequency Plasma Reactor

A 360° rotatable plasma reactor was employed to help achieve uniform and complete coating of particles. A cylindrical Pyrex glass reactor of 5 centimeter internal diameter and 45 centimeter in length was used as the plasma chamber. Radio frequency (RF) power to the reactor was provided through two concentric metal rings separated by a distance of 20 centimeter. The volatile reaction products and unreacted monomer were collected in a liquid nitrogen cold trap located downstream of the reactor. A butterfly valve controller with pressure transducer (MKS Baratron Model 252A) was used both to monitor and control pressure in the reactor. The flow rate of the monomer was controlled and monitored by a flowmeter placed upstream of the reactor. Ferrofluidic valves, inserted at both ends of the reactor tube, permitted complete rotation of the reactor chamber under vacuum conditions. The rotation rate was controlled with a variable speed motor (Dayton Model 4Z827D) connected by pulley to the reactor.

A schematic of a plasma reactor of the present invention, with its associated electronics, is shown in FIG. 1. In this embodiment, the reactor includes a radio frequency amplifier (ENI model A300), a pulse generator (Tektronix model 2101), a function generator (Wavetek model 166), a frequency counter (Hewlett-Packard model 5315A) and a capacitor/inductor matching network used to tune the circuit to minimize reflected power. Applied and reflected power were measured in volts with an oscilloscope (BK Precision model 2120B) which was also used to monitor the matching network. The matching network was employed to minimize the reflected energy during the course of each run. The entire reactor was located inside a Faraday cage to prevent radiation of the RF energy to the external environment. While a radio frequency of 13.56 MHz was used, other frequencies may also be used as seen fit or as required.

Carbonaceous compounds of the present invention were deposited onto particles using a reactor, similar to one described above. Those skilled in the art will appreciate that the features described may also be modified as needed. For most reactions, the rotation rate was kept steady (e.g., 4 rev/minute for acetylsalicylic acid crystal particles or 3 rev/minute for ibuprofen crystal particles). The lower rotation rate for ibuprofen minimized the adsorption of the smaller particles on the walls of the reactor chamber by electrostatic forces. The quantity of particles placed in the reaction chamber, in each run, was, in some cases, used as a variable and this effect was evaluated.

Self-aggregation and/or electrostatic forces were reduced by several methods, including increasing the monomer flow rate, decreasing the rotation rate of the reactor chamber and/or limiting the peak power to 100 Watts or less. Applying vibration to the reactor walls as well as applying a surface treatment to minimize adhesions may also be employed. In addition, it is also possible to recover coated particles that have adhered to the reactor wall. In general, the percent recovery (ratio of the amount of recovered particles that are coated vs. total amount of particles introduced into the reactor) may typically range from 50% to 99%. One skilled in the art will appreciate that other typical ranges may apply.

Reactor Preparation

Before each coating, the reactor chamber was pre-cleaned (e.g., with soap and water and acetone). It was then vacuumed to a background pressure (e.g., approximately 10 mTorr). Next, the reactor was treated with an oxygen plasma discharge (e.g., 100 Watts at 100 mTorr pressure, operated at a duty cycle of ⅓ ms/ms or ⅕ ms/ms). Pre-cleaning removes polymer residues from the chamber due to previous coatings. After the oxygen plasma discharge, particles would be placed into the reactor. The two ends of the chamber were stoppered (e.g., with glass wool) to keep the particles in the chamber during coating. The reactor chamber was then evacuated to the background pressure.

Plasma Polymerization

In general, and for example coatings provided herein, the reaction chamber was rotated constantly. Using the pulsed plasma approach, significant polymer film formation occurred during plasma off periods, a time when undesirable high energy reactions between ion-radical and particles are minimized. A process of continuous wave plasma polymerization may also be employed to encapsulate particles.

The average power employed under pulsed plasma conditions was calculated according to the formula shown below (1), where $\tau_{on}$ and $\tau_{off}$ are the plasma on and off times and $P_{peak}$ is the peak power. By using pulsed plasma polymerization, the average power employed during film formation was often much lower than the power employed under continuous wave reaction conditions, because of the relatively longer plasma off times compared to plasma on times.

$$P_{average} = \frac{\tau_{on}}{\tau_{on} + \tau_{off}} \times P_{peak} \qquad (1)$$

Deposition (polymerization) of the coating or polymer film of the present invention was controlled by altering a number of variables associated with the plasma reactor. Variables included duty cycle, power input, peak power, flow rate of the monomer, pressure of the reactor, coating time period and quantity of particles introduced into the reaction chamber at a time.

With the present invention, suitable plasma on/off times (duty cycles) were generally in the millisecond range. As used herein, duty cycles are reported as on/off times per cycle and provided in units of ms/ms. Suitable peak powers ranged from about 25 W to about 100 Watts. Suitable coating periods were typically between about 20 minutes and 1 hour. In some cases, self-aggregation of particles may help determine the coating time period. The amount of particles coated at a time typically ranged from about 0.5 grams to about 4.0 grams. Flow rates were about 1.5 cm³ (STP)/minute to about 2.00 cm³ (STP)/minute. The pressure of the reactor typically varied from about 150 mTorr to about 350 mTorr. Those skilled in the art will appreciate that, while typical ranges and values are provided, there is no reason that other values may not be applied, as needed.

Characterization of Plasma Polymers

To help characterize the coating or polymer film deposited by the present invention, replicate runs of certain carbonaceous compounds were provided in which the carbonaceous compound was deposited on one or more solid substrates, such as silicon wafers and KBr surfaces. The FT-IR spectra were collected with a Bruker Vector 22 spectrophotometer using 4 cm¹ resolution. Spectra were recorded in absorption mode on polymer films deposited on KBr discs. The thickness of the films deposited on silicon wafers were measured using a Tencor Alpha Step 200 profilometer. A syringe needle was employed to scribe a scratch on the films. Thickness calculations were based on the difference between the height of the film and original height of the substrate.

Particle Introduction and Release into an Environment

The environmental conditions for introduction of one or more particles into an environment may also be manipulated to alter particle release. For example, in one aspect of the present invention, the environment for acetyl salicylic acid was 0.1 M HCl solution (to simulate gastric fluid). For ibuprofen, the environment was a pH 7.0 phosphate buffered solution (to simulate intestinal fluid).

The quantity of particles introduced into an environment was assessed using a UV-visible spectrophotometer (Janco). The maximum absorption wavelength for acetylsalicylic acid was determined to be 276 nm. Absorbance versus time measurements were taken periodically using 1-cm quartz cuvettes. Stock solutions were prepared with 10 mg of particles in 100 ml of solution. Each solution was stirred constantly in a 100 ml volumetric flask. At the end of each period, an aliquot was transferred into a cuvette; the liquid was returned to the volumetric flask as soon as the absorbance data were taken. The maximum absorption wavelength for ibuprofen was determined to be 264 nm. With the exception of pH change, the same procedures as employed for acetyl salicylic acid were followed for ibuprofen. For kinetic analysis, model fittings were performed using Microsoft Excel.

Thin-Layer Chromatography (TLC)

Silica gel, polyester-backed TLC plates of thickness 250 µm were used to analyze the separation and/or breakdown of compounds after polymerization and after particle release into an environment. Before use, TLC plates were dried in an oven for about 1 hour at 110 degrees Centigrade to remove adsorbed atmospheric moisture.

For calculations, the distinction between different components in a mixture was determined by a physical constant called retention factor ($R_F$) which is based on the preferential interaction between the compound and the TLC plate. It is known that each compound generally has a different retention factor. If a compound is converted, separated, or structurally altered during plasma polymerization, it will generally have a different $R_F$ value. Thus, free particles and encapsulated particles were prepared by dissolving 10 mg of each in 1 ml of dichloromethane.

All TLC solutions were freshly made and aliquots of 5 µl were applied as spots approximately 1 cm apart onto 5×17 cm silica gel TLC plates. A chloroform-acetone (4+1) solvent system was used. Plates were air-dried and analyzed by iodine vapor. Retention factors were calculated for each encapsulated particle and compared to the value obtained for unencapsulated (i.e., free) particle. These values were compared to those known in the literature.

Plasma Polymerization of Allyl Alcohol

Allyl alcohol was used as a representative carbonaceous compound for coating particles of the present invention. It was determined that as the RF duty cycle was reduced, the retention of the monomer's oxygen content increased, leading to an increase in the hydrophilicity of the coating or polymer film (also referred to herein as film). An increase in the plasma off time also caused an increase in the —OH group incorporation in the coating thus increasing surface density of polar groups. In addition, significant polymer film growth occurred during the plasma off times. Deposition per pulse cycle was shown to increase at constant on time and power, as the off time increased.

FT-IR Analysis of Plasma Polymerized Allyl Alcohol Films

Plasma polymerized allyl alcohol films were examined as a function of power, coating time and pulsed or continuous wave modes. Some results are illustrated in FIGS. 2-4. FIG. 2 shows the increase in the retention of the monomer's oxygen content as peak power was adjusted from 100 W to 25 W, where relative intensities of the O—H group (~3400 $cm^{-1}$) and C—H group (~2900 $cm^{-1}$) are clearly visible. Here, decreasing peak power increased the wettability of the coating or polymer film. In addition, increasing peak power created additional C=O groups (~1700 $cm^{-1}$); the extent of C=O formation, relative to OH incorporation in the polymer film, decreased with decreasing peak power.

FIG. 3 shows that the intensities of stretching vibrations of all the groups decreases as coating time decreased. No additional peaks were observed. The same general observations were made for the spectra obtained for CW plasma polymerization of allyl alcohol at powers 10 and 25 W.

Regarding FT-IR analysis of the films with changing RF duty cycles, there was a progressive increase in the retention of the monomer's oxygen content with decreasing RF duty cycles. In addition there was a continual shift in the O—H stretching frequency to lower wave numbers with increased O—H incorporation as a result of H-bonding. The trends mentioned above applied for duty cycles from ½ ms/ms and ⅕ ms/ms; similar trends occurred for RF duty cycles less than ⅕ ms/ms. In addition, there was a slight increase in the retention of the monomer's oxygen content with duty cycles from ½ to ⅕ ms/ms.

Plasma Polymerized Allyl Alcohol Films Encapsulating Acetylsalicylic Acid Crystals Some of the reaction and coating conditions for coating particles of acetylsalicylic acid with one or more carbonaceous compounds of allyl alcohol are illustrated in TABLE 2. Polished Si substrates were also coated and profilometer measurements were made. Pressure in the reactor was about 160 mTorr with a constant rotation rate of about 4 rev/min. The approximate quantity of particles introduced into the reaction chamber for each run (e.g., AA1, AA2, etc) was about 4 grams. Actual particle sizes ranged from about 1 to about 100 microns; mean size was approximately 30 microns, as observed by light scattering measurements.

TABLE 2

Examples when coating particles of acetylsalicylic acid with allyl alcohol.

| Coating | Monomer Flowrate ($cm^3$(STP)/min) | Peak Power (Watts) | RF Duty Cycle On/off (ms/ms) | Coating Time (min) | Film Thickness (kA°) | Energy Efficiency (mA°/J) |
|---|---|---|---|---|---|---|
| AA1 | 1.5 | 100 | 1/5 | 30 | 4.9 | 160 |
| AA2 | 1.5 | 25 | 1/5 | 30 | 4.0 | 530 |
| AA3 | 1.5 | 25 | 1/5 | 60 | 7.4 | 500 |
| AA4 | 1.5 | 25 | 1/3 | 60 | 4.0 | 180 |
| AA5 | 1.5 | 50 | 1/5 | 30 | 5.9 | 390 |

TABLE 2 shows the variations in film thickness. For pulsed plasma polymerization of allyl alcohol, the energy efficiency of film formation (mA°/J) increased with decreasing power input (samples AA1, AA5 and AA2). Ablation reactions may be significant at higher power inputs. Changing the coating time (other variables held constant) effected film thickness. For example, when coating time was doubled, the film thickness increased by a factor of 2. Decreasing the duty cycle increased the energy efficiency of film formation and indicated that there was significant film growth during plasma off periods.

FIGS. 5-7 show the effects of power, coating time and RF duty cycle on the rate of release of particles into an environment (illustrated as percent particle release versus immersion time). Uncoated crystals are identified as free crystals or bare crystals. Plasma coatings deposited on the particles (e.g., acetylsalicylic acid crystals) effected the rate of release of particles. In FIG. 5, the quantity of particles introduced into an environment (release rates) are shown as a function of the peak power employed during coating. Changing the power input had a large effect on the release rate. For example, doubling the power input during coating led to a 2-fold increase in the time required for complete release of the particle. Complete release (introduction of particles into the environment) was 80 minutes for AA2 (at 25 W), 220 minutes for AA5 (at 50 W) and 400 minutes for AA1 (at 100 W).

FIG. 5 also shows that polymer film composition is affected by power input. Polymer cross-linking increased when peak power was increased. Increased cross-linking provided a less porous barrier and reduced the release rate. The increased cross-linking of the polymer film at higher peak powers is consistent with FT-IR and XPS analysis and consistent with other information known in the art. When the release rates were evaluated (release for first 20 minutes as the rate of rise or slope), it was observed that there was an initial release rate of 2.58 for AA2 (25 W), 0.886 for AA5 (50 W) and 0.616 for AA1 (100 W) (see k values in FIG. 5). Adjusting the power from 100 W to 50 W increased the initial release rate by a factor of 1.4; decreasing the power by the same ratio to 25 W increased the release rate 3 fold.

The duration of the plasma coating time had an effect on particle release rate. FIG. 6 shows that doubling the coating time increased the time required for complete release of the particle by a factor of 2 (from 80 minutes for AA2 to 160 min for AA3). The slope from AA2 to AA3 decreases by 0.7 (from 2.58 to 1.8).

FIG. 7 shows the effect of duty cycle on release rates. Two different plasma duty cycles were used: $\frac{1}{3}$ ms/ms and $\frac{1}{5}$ ms/ms. Coating runs were 60 minutes. Polymer film deposited with a lower duty cycle ($\frac{1}{5}$ ms/ms) were almost twice as thick as those of the higher, $\frac{1}{3}$ ms/ms duty cycle (7.45 kA° versus 4.00 kA°). Despite a greater polymer thickness, the release rate of particles coated with a duty cycle of $\frac{1}{5}$ ms/ms was about 1.4 times faster than particles coated with a duty cycle of $\frac{1}{3}$ ms/ms. Higher duty cycles typically introduce more cross-linking accounting for the slower release rate.

As described above, the present invention is used to control the characteristics of a coating or polymer film deposited on a particle using a pulsed or continuous wave radio frequency. The control factors include coating time, peak power input and pulsed plasma duty cycle. The present invention also controls polymer film thickness and polymer film cross-linking, as well as the rate of release of the particle from the polymer film.

Plasma Polymerized Allyl Alcohol Films Encapsulating Ibuprofen Crystals

Some of the reaction and coating conditions for coating particles of ibuprofen with allyl alcohol are illustrated in TABLE 3. IA1, IA2, IA3, and IA4 were performed under pulsed conditions and IA5 and IA6 were performed under continuous wave conditions. The pressure in the reactor was about 260 mTorr with a constant rotation of about 3 rev/min. Approximately 0.8 grams of crystals were used each time; crystals were typically smaller than 35 µm.

TABLE 3

Examples of conditions when coating particles of ibuprofen with allyl alcohol.

| Coating | Monomer Flowrate (cm³(STP)/min) | Peak Power (Watts) | RF Duty Cycle On/off (ms/ms) | Coating Time (min) | Film Thickness (kA°) | Energy Efficiency (mA°/J) |
| --- | --- | --- | --- | --- | --- | --- |
| IA1 | 2.0 | 50 | 1/3 | 40 | N/A | N/A |
| IA2 | 2.0 | 50 | 1/5 | 40 | N/A | N/A |
| IA3 | 2.0 | 50 | 1/3 | 20 | N/A | N/A |
| IA4 | 2.0 | 30 | 1/3 | 40 | N/A | N/A |
| IA5 | 2.0 | 10 | CW | 10 | 4.2 | 690 |
| IA6 | 2.0 | 25 | CW | 10 | 5.2 | 350 |

TABLE 3 shows that increasing the power under continuous-wave conditions effects the energy efficiency of film formation; increased power decreased the energy efficiency of polymer film formation. Note that for each run, total CW power input was comparable to the power used in the pulsed experiments, because the average power under pulsed plasma conditions corresponded to $\frac{1}{6}^{th}$ or $\frac{1}{4}^{th}$ of the peak power reported.

The release rates of encapsulated ibuprofen were examined as a function of peak power, coating time and plasma duty cycle. Both CW and pulsed conditions were evaluated and some of the results shown in FIGS. 8-11.

In general, the rate of release of ibuprofen was faster than the rate of release of acetyl salicylic acid. This faster rate is largely a reflection of the higher solubility of ibuprofen. FIG. 8 shows that with a pulsed plasma deposition time of 40 minutes, there was a decrease in the ibuprofen release rate by a factor of 3.6, when peak power increased from 30 W to 50 W.

Increasing the coating time increased the time required to complete particle release (see FIG. 9). IA3 took 36 minutes for complete particle release, whereas IA1 took 90 minutes; coating time was doubled from IA3 to IA1. In addition, power input results closely correlate with results for coating time.

FIG. 10 shows the effect of duty cycle on release rates. As with acetyl salicylic acid particles, release rates were sensitive to changes in duty cycle. A higher duty cycle resulted in a lower particle release rate. For example, changing the duty cycle from $\frac{1}{5}$ ms/ms to $\frac{1}{3}$ ms/ms, increased the time to complete particle release from 47 minutes to 90 minutes with a slope in the first 6 minutes of 6.33 to 3.17, respectively (see also FIG. 8).

When depositing the polymer film using CW conditions with different peak powers (10 W and 25 W, TABLE 3), the release rate was also affected as shown in FIG. 11. While lower power inputs were used with CW depositions (10 W and 25 W for CW vs. 30 W and 50 W for pulsed), the average power input, computed as duty cycle×peak power, were generally the same for each. In addition, CW depositions produced similar film thicknesses as those produced with pulsed plasma depositions.

Plasma Polymerization of Perfluorohexane

Plasma polymerization characteristics of perfluorocarbons have been provided by the present inventors (see U.S. Pat. Nos. 5,876,753; 6,306,506; 6,214,423; 6,329,024; 6,482,531). $CF_x$ radicals, especially $CF_2$ radicals and F atoms in gas phase are important for polymer film formation. $CF_2$ radicals are generally thought to be responsible for the formation of the linear portion of deposited fluorocarbon polymer films, whereas quaternary $C$-$CF_n$ type radicals are involved in cross-linking. The same holds true for perfluorohexane. Films produced by plasma polymerization of perfluorocarbons vary from a highly cross-linked structure at high plasma duty cycle to a more linear $CF_2$ dominated structure at low plasma duty cycle. Decreasing the duty cycle reduces the cross-linkages. Similarly, as the peak power is decreased, a more linear polymer structure is observed; $CF_2$ content increases at low peak power.

Coatings produced using perfluorocarbons are generally highly hydrophobic. A rough and fibrous-like morphology appears to be responsible for this, because high power inputs accompanied by relatively long plasma off times resulted in fibrous-like ultrahydrophobic surfaces on the polymers films. With the present invention, plasma polymerization of a hydrophobic polymer film, such as perfluorohexane, can also be manipulated to control the introduction and release of a particle into an environment.

FT-IR Analysis of Plasma Polymerized Perfluorohexane Films

Plasma polymerized perfluorohexane films were examined as a function of peak power and plasma duty cycle. (See FIGS. 12 and 13) FT-IR analysis of perfluorohexane films showed a single broad band at ~1200 cm$^{-1}$ indicating the presence of a wide range of CF stretching frequencies leading to a heterogeneous, highly crosslinked fluorocarbon film. Film compositions were similar with the application of different duty cycles. Polymer films of perfluorohexane are typically hydrophobic.

Plasma Polymerized Perfluorohexane Films Encapsulating Acetylsalicylic Acid Crystals Some of the reaction and coating conditions for coating particles of acetylsalicylic acid with perfluorohexane are illustrated in TABLE 4.

TABLE 4

Examples when coating acetylsalicylic acid with perfluorohexane.

| Coating | Amount of Crystals Coated In Each Run (gr) | Peak Power (Watts) | RF Duty Cycle On/off (ms/ms) | Coating Time (min) |
|---|---|---|---|---|
| AP1 | 4 | 100 | 1/5 | 60 |
| AP2 | 4 | 100 | 1/3 | 60 |
| AP3(1) | 4 | 100 | 1/5 | 30 |
| AP3(2) | 3 | 100 | 1/5 | 60 |
| AP3(3) | 2 | 100 | 1/5 | 90 |
| AP3(4) | 1 | 100 | 1/5 | 120 |

For TABLE 4, the flow rate of the monomer was about 1.5 cm$^3$ (STP)/min and pressure in the reactor was about 130 mTorr with a constant rotation rate of about 4 rev/min. For AP3, rather than a single run, about 4 grams were introduced into the chamber and one gram of sample was removed every 30 minutes, signified as AP3(1), AP3(2), AP3(3), AP3(4), for a total of two hours.

Referring to TABLE 4, the duration of plasma coating times were observed to have an effect on particle release rates (see AP1 and AP2). For AP3 runs, the effect of coating time on quantity of particles was evaluated. The results are indicated as percent release versus immersion time in the simulated gastric solution (FIGS. 14 and 15). FIG. 14 shows that duty cycle had an effect on initial release rate (measured as slope taken in the first 20 minutes of release) and for complete particle release. With a change in duty cycle of 1/5 ms/ms (AP1) to 1/3 ms/ms (AP2), there was a 41% increase in the time required for complete particle release; the initial rate of release decreased by a factor of 0.83. The thickness of the film deposited at 1/3 ms/ms was, however, higher than that produced at 1/5 ms/ms.

FIG. 15 shows that increasing the coating time decreased the rate of release. For example, the initial rate of release for AP3(1), AP3(2), AP3(3) and AP3(4) are 1.55, 0.81, 0.39 and 0.25 corresponding to coating times of 30, 60, 90 and 120 minutes, respectively. As such, the present invention is able to control the coating of a polymer film that is hydrophobic as well as hydrophilic.

Plasma Polymerized Perfluorohexane Films Encapsulating Ibuprofen Crystals

Some of the reaction and coating conditions for coating particles of ibuprofen with perfluorohexane are illustrated in TABLE 5.

TABLE 5

Examples of conditions used when coating ibuprofen with perfluorohexane.

| Coating | Amount of Crystals Coated In Each Run (gr.) | Peak Power (Watts) | RF Duty Cycle On/off (ms/ms) | Coating Time (min) | Film Thickness (kA°) | Energy Efficiency (mA°/J) |
|---|---|---|---|---|---|---|
| IP1 | 1 | 50 | 1/3 | 40 | 2.5 | 84 |
| IP2 | 1 | 50 | 1/5 | 40 | 1.6 | 83 |
| IP3 | 1 | 50 | 1/3 | 20 | 1.3 | 86 |
| IP4 | 1 | 30 | 1/3 | 40 | 2.4 | 130 |
| IP5 | 0.5 | 100 | 1/3 | 40 | N/A | N/A |

For TABLE 5, the flow rate of the monomer was about 2.0 cm$^3$ (STP)/min and the pressure in the reactor was about 300 mTorr with a constant rotation rate of about 3 rev/min. Polished silicon wafer substrates were also coated and profilometer measurements were made.

With pulsed plasma polymerization of perfluorohexane, increasing the peak power decreased the energy efficiency of film formation, similar to allyl alcohol film formation. Changing the coating time (other variables held constant) greatly effected film thickness. For example, doubling the coating time, doubled film thickness.

FIGS. 16-18 illustrate the effects of power, coating time, RF duty cycle and amount of coated crystals on rate of release (as percent release vs. immersion time in simulated intestinal fluid). While release rates are generally faster for ibuprofen-coated crystals as compared with acetyl salicyclic acid-coated crystals, the rate is, in a large part, thought to be due to the greater solubility of ibuprofen and the smaller size of its crystals. Overall, increasing the peak power or coating time delayed the release of perfluorohexane-coated particles; increasing the plasma duty cycle also delayed release.

Plasma Polymerization of Methyl Methacrylate

Films formed by the polymerization of methyl methacrylate have polyester groups that are biocompatible. Such polymer films are typically very stable in phosphate buffered solutions (pH=7.4) and resist hydrolysis. Through X-ray photoelectron spectroscopy (XPS) analysis, it was observed that oxygen content in such films increased as the peak power decreased. As peak power increased, the deposition rate was observed to decrease. In addition, polymer film growth occurred during the off periods with pulsed plasma deposition. Comparison of coatings produced under pulsed plasma and CW conditions, showed that more ester groups were incorporated with pulsed polymerization and ester groups retention was enhanced as the average power was reduced.

Polymerized Methyl Methacrylate Films Encapsulating Acetylsalicylic Acid Crystals Some of the reaction and coating conditions for coating particles of acetylsalicylic acid with methyl methacrylate are illustrated in TABLE 6. For TABLE 6, the flow rate of the monomer was about 2.0 cm$^3$ (STP)/min and the pressure in the reactor was about 230 mTorr with a constant rotation rate of about 3 rev/min. Polished silicon wafer substrates were also coated and profilometer measurements were made.

TABLE 6

Examples when coating acetylsalicylic acid with methyl methacrylate.

| Coating | Amount of Crystals Coated In Each Run (gr.) | Peak Power (Watts) | RF Duty Cycle On/off (ms/ms) | Coating Time (min) | Film Thickness (kA°) | Energy Efficiency (mA°/J) |
|---|---|---|---|---|---|---|
| AM1 | 4 | 50 | 1/3 | 30 | 5.5 | 240 |
| AM2 | 4 | 50 | 1/5 | 60 | N/A | N/A |
| AM3 | 4 | 50 | 1/3 | 60 | N/A | N/A |
| AM4 | 4 | 100 | 1/3 | 30 | 6.1 | 130 |

As with the other carbonaceous compounds, TABLE 6 shows that increasing the peak power from 50 W to 100 W increased the film thickness but decreased the overall energy efficiency of a polymer film of methyl methacrylate. In TABLE 6, N/A represents those samples where the tackiness of methyl methacrylate did not allow for the measurement of film thickness or energy efficiency.

Figure 20:
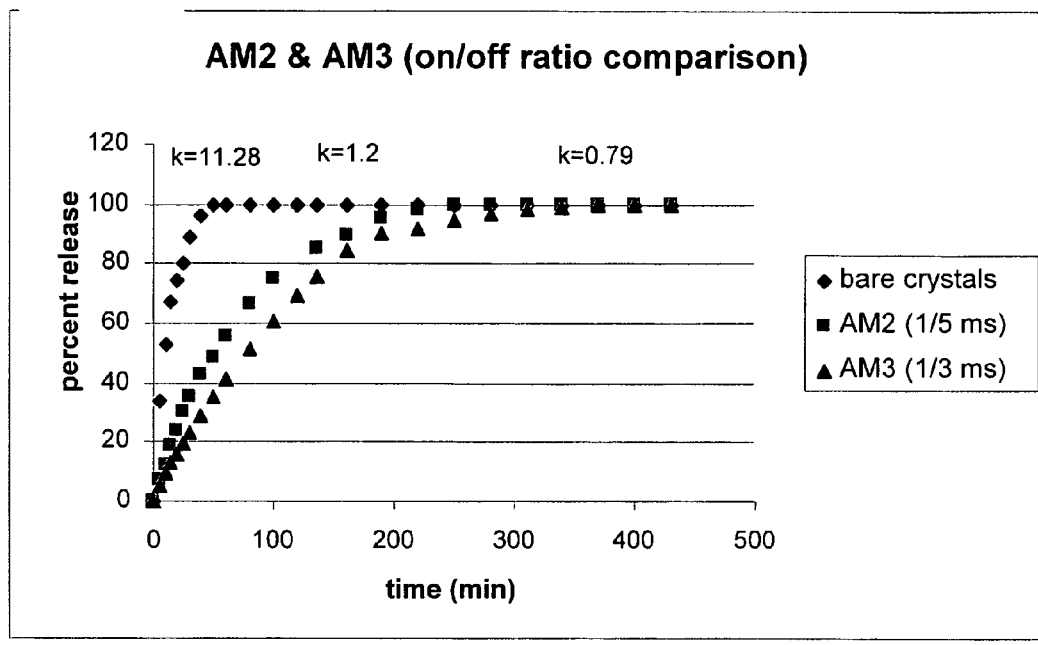
FIG. 20 depict release rates of acetylsalicylic acid coated with polymethylmethacrylate as a function of coating time.
Figure 21:
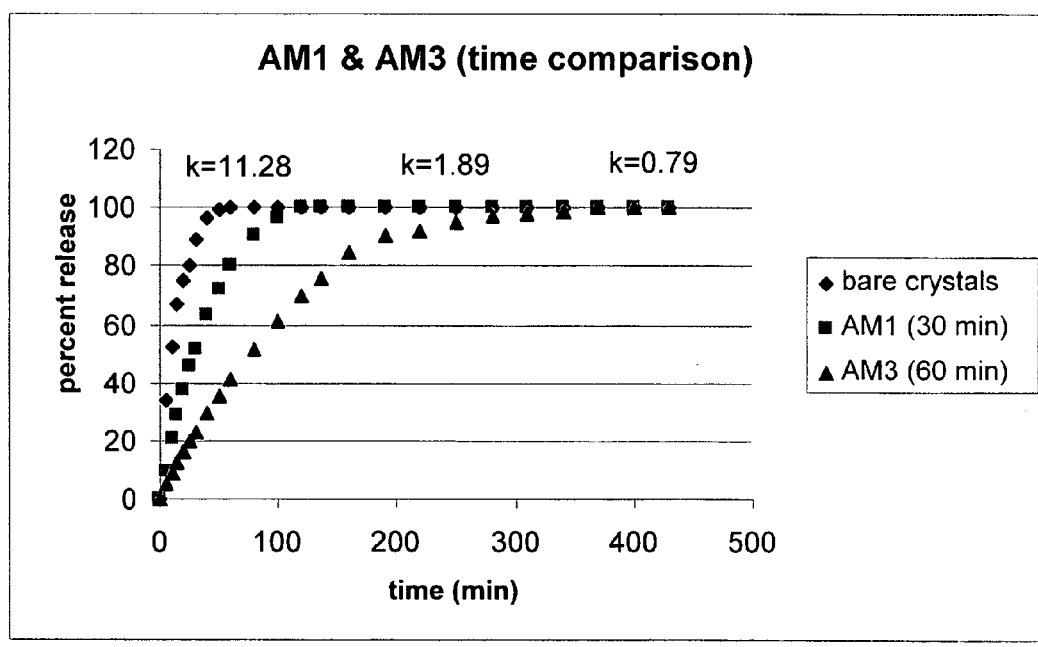
FIG. 21 depict release rates of acetylsalicylic acid coated with polymethylmethacrylate a function of duty cycles.
Figure 24:
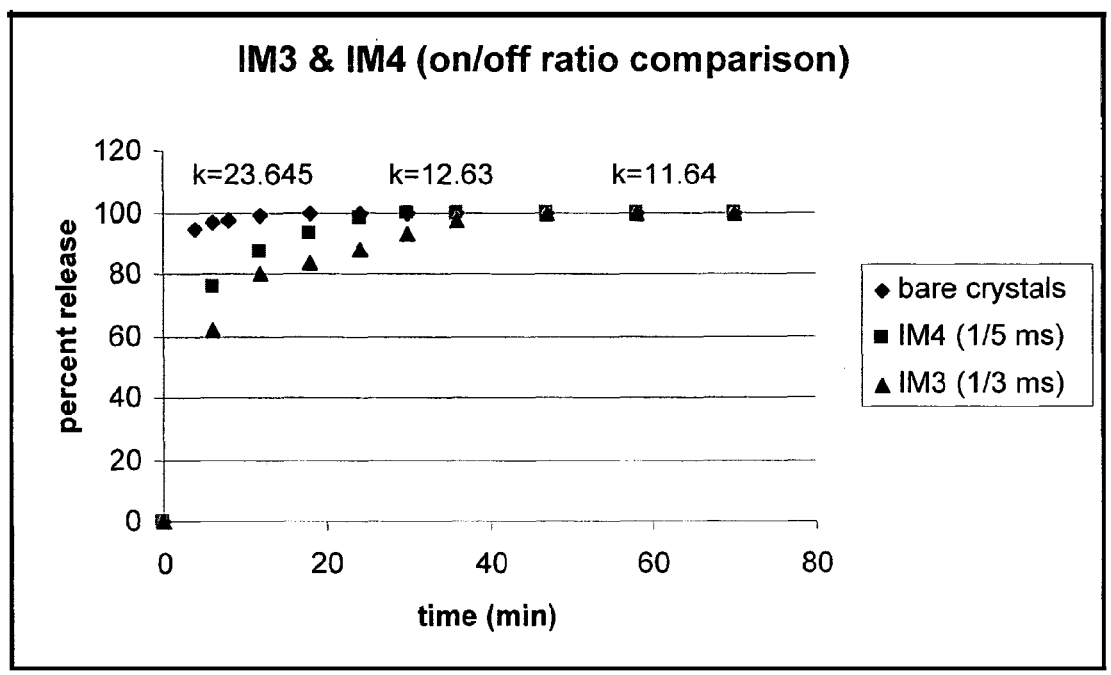
FIG. 24 depict release rates of ibuprofen coated with polymethylmethacrylate a function of duty cycles.
Figure 25:
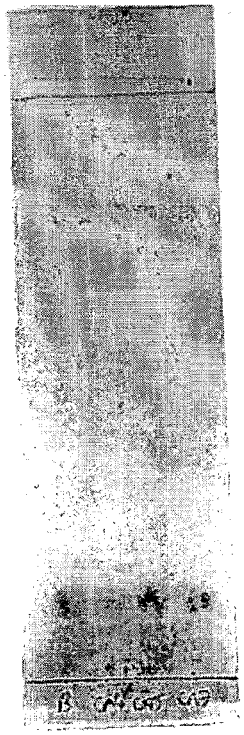
FIG. 25 depicts a TLC result after running with acetylsalicylic acid samples in accordance with one aspect of the present invention.
Figure 26:
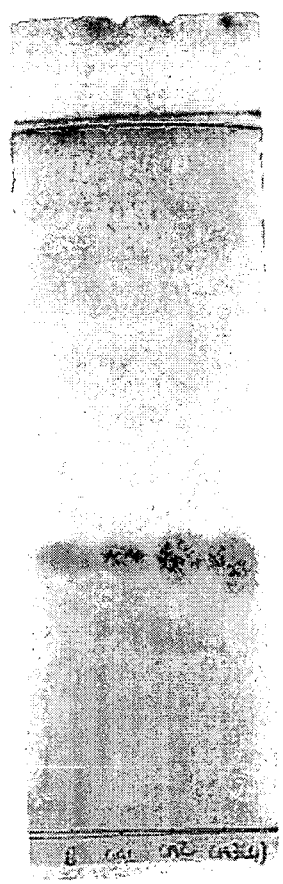
FIG. 26 depicts a TLC result after running with ibuprofen samples in accordance with one aspect of the present invention.

FIGS. 19-21 show the effects of power input, coating time and RF duty cycle on the rate of release of particles into an environment (illustrated as percent particle release versus immersion time in simulated gastric fluid).

As with polymer films of polyallyl alcohol and polyperfluorohexane, FIGS. 19 and 20 show that with films of polymethyl methacrylate, increasing the power input (FIG. 19) and coating times (FIG. 20) reduced the rate of release of particles into the environment. For example, increasing the peak power input from 50 to 100 W decreased the release rate by a factor of 5.5. Doubling the coating time decreased the release rate by a factor of 2.4.

FIG. 21 shows that changing the plasma duty cycle from ⅕ ms/ms to ⅓ ms/ms during plasma polymerization decreased the initial release rate by a factor of 1.5. While these changes were larger than those for polymer films of polyallylalcohol, all results remained consistent. The larger changes are generally due to the fact that films deposited with methyl methacrylate compounds were generally thicker than coatings deposited by the other carbonaceous compounds.

Plasma Polymerized Methyl Methacrylate Films Encapsulating Ibuprofen Crystals

Some of the reaction and coating conditions for coating particles of ibuprofen with methyl methacrylate are illustrated in TABLE 7.

TABLE 7

| Examples of conditions when coating ibuprofen with methyl methacrylate. | | | | |
|---|---|---|---|---|
| Coating | Amount of Crystals Coated In Each Run (gr.) | Peak Power (Watts) | RF Duty Cycle On/off (ms/ms) | Coating Time (min) |
| IM1 | 0.5 | 100 | 1/3 | 20 |
| IM2 | 0.5 | 50 | 1/3 | 20 |
| IM3 | 1 | 50 | 1/3 | 20 |
| IM4 | 1 | 50 | 1/5 | 20 |

For TABLE 7, the flow rate of the monomer was about 2.0 $cm^3$ (STP)/min and the pressure in the reactor was about 300 mTorr with a constant rotation rate of about 4 rev/min. The amount of crystals used with IM1 and IM2 was about 0.5 gram and about 1 gram used for IM3 and IM4. Polished silicon wafer substrates were also coated and profilometer measurements were made.

FIGS. 22-24 show the effects of power input, quantity of particles coated and RF duty cycle on the rate of release of particles into an environment (illustrated as percent particle release versus immersion time in simulated intestinal fluid).

Referring now to FIG. 22, doubling the power input (IM2 to IM1) led to an 138% increase in the time required for complete release of particles into the environment. When looking at the initial release rate, doubling the peak power decreased the initial release rate by a factor of 3.6.

FIG. 23 shows that the above release behavior was independent of the quantity of coated particles. For example, doubling the quantity of coated particles from 0.5 grams to 1.0 grams had little effect on particle release rates; complete particle release was similar for IM2 and IM3.

FIG. 24 shows that the release behavior for ibuprofen particles coated with methyl methacrylate was consistent with the release behavior of similar particles coated with other carbonaceous compounds (e.g., allyl alcohol and perfluorohexane). As with other carbonaceous compounds, increasing the duty cycle decreased release rate of ibuprofen particles coated with polymethyl methacrylate.

TLC Analysis

Using thin-layer chromatography, it was observed that particles of the present invention were not degraded or converted to other compounds of different molecular weight or $R_f$ value as a result of plasma deposition; no additional spots other than those corresponding to the particle were observed on any of the TLC plates. FIGS. 25 and 26 are representative of the many analyses that were performed with various particles with and without a number of different coatings. All analyses revealed the same results.

For FIGS. 25 and 26, a calculation of the retention factor for particles of acetylsalicylic acid (FIG. 25, lanes 1 to 4) or ibuprofen (FIG. 26, lanes 1-4) were made. The average retention factor for acetylsalicylic acid particles (FIG. 25, lanes 1 to 4) was calculated to be 0.14, while the retention factor of ibuprofen particles (FIG. 26, lanes 1 to 4) was calculated to be 0.39. In both FIGS. 25 and 26, lane 1 contained the uncoated (free) particle that did not undergo plasma deposition, while lanes 2-4 contained plasma deposited particles of acetylsalicylic acid (FIG. 25) or ibuprofen (FIG. 26). These data are consistent with what is known in the art; with a chloroform-acetone (4+1) solution as the solvent and using silica as the adsorbent, the retention factor for acetylsalicylic acid is generally about 0.18 and the retention factor for ibuprofen is generally about 0.46. Four reference compounds were used: methohexitone, quinalbarbitone, clonazepam and paracetamol.

The above examples illustrate that plasma deposition (polymerization) of at least one carbonaceous compound on the surface of a particle results in the encapsulation of that particle with a polymer film. The carbonaceous compound may be hydrophilic and/or hydrophobic, capable of forming a hydrophilic or hydrophobic polymer film, respectively. As described herein, plasma deposition is used to control aspects of the coating or polymer film (e.g., surface area, cross-linking, wettability, extent of hydrophilicity or hydrophobicity, number and/or density of side groups, overall thickness) via reaction conditions such as power input, peak power, coating time, pulsed plasma duty cycle, as examples. The control of polymerization directly effects and, thus, controls the introduction of the encapsulated particle into the environment. This introduction is typically a function of the rate of release, including the initial rate of release of the particle and the total time for complete particle release, as examples.

With the present invention, plasma deposition is capable of controlling particle introduction into an environment. The control depends, in part, on one or more plasma deposition variable(s) (e.g., reaction conditions) that may be altered.

Some of the variables and their effects on the rate of particle release are illustrated in TABLE 8.

TABLE 8

Examples of plasma deposition variables and their effects.

| Variable | Rate of Release |
| --- | --- |
| Power increase | Decreased |
| Coating time increase | Decreased |
| Duty cycle increase | Decreased |

With the present invention, a polymeric film functions similar to a permeation barrier between a particle and an environment. When an encapsulated particle is introduced to an environment, typically there is dissolution of all or part of the particle into the environment. As such, altering reaction conditions such as power input, coating time, and/or duty cycle during plasma deposition of the present invention, will alter particle dissolution. For example, as illustrated, increases in coating or polymer film thickness reduced the rate of release of a particle encapsulated by a polymer film. Increasing the power input or plasma duty cycle during coating reduced the porosity of the polymer film, increased the extent of cross-linking of the polymer film, and reduced the rate of release of the particle encapsulated by the polymer film.

Kinetic Analysis of Particle Release Rates

Kinetic analyses of release rates were performed using either zero-order or first-order kinetics. For zero-order kinetics, there is typically an initial diffusion of water into the encapsulated particle followed by a saturated solution in which both liquid and undissolved solid remain in equilibrium. This process obeys equation (2), where $M_r$ is the amount of particle released at time t; $M_0$ is the total amount of particle before dissolution; $k_0$ is the zero-order release constant and t is time.

$$\frac{M_r}{M_0} = k_0 t \quad (2)$$

Figure 27:
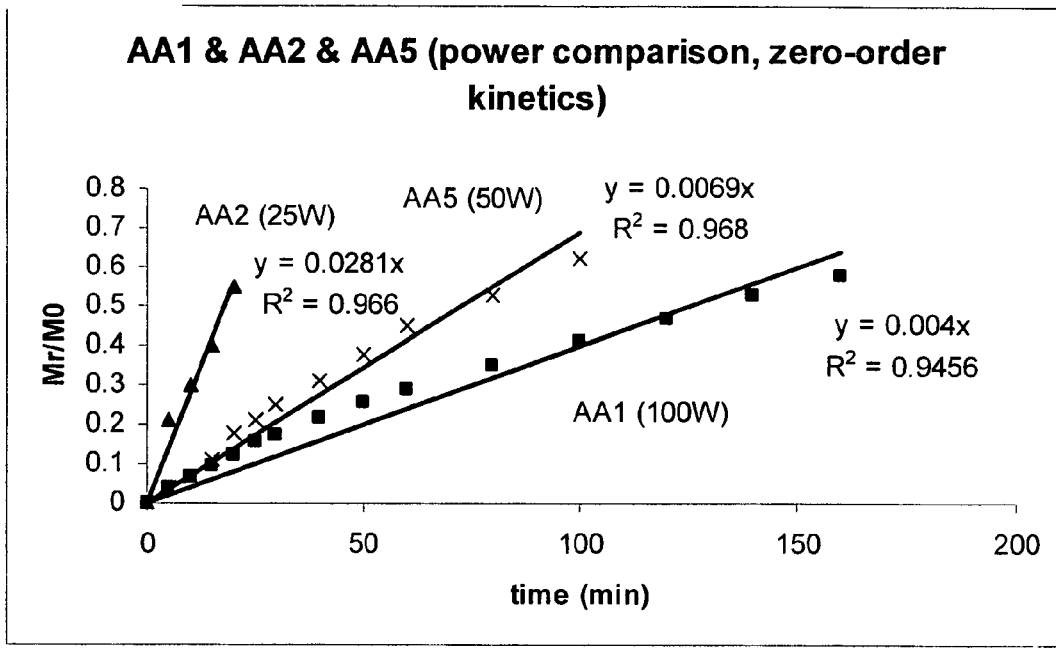
FIG. 27 depicts zero-order release kinetics of acetylsalicylic acid coated with polyallyl alcohol as a function of peak power.
Figure 28:
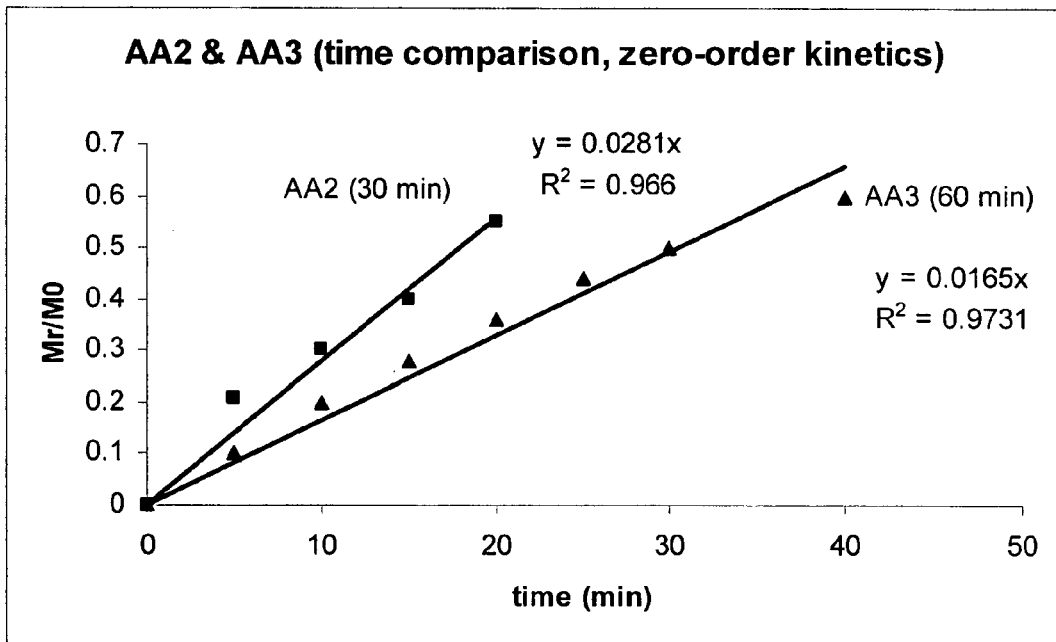
FIG. 28 depicts zero-order release kinetics of acetylsalicylic acid coated with polyallyl alcohol as a function of coating time.

Zero-order kinetic data for acetylsalicylic acid crystal particles coated with polyallyl alcohol are shown in FIGS. 27-29, which included data for the release of 60% of the total particles. The R value for FIGS. 27-29, was, on average, 0.97 and ranged from 0.977 to 0.946

For first-order kinetics, there is typically an initial, rapid influx of a solution into the encapsulated particle. The particle is then solubilized followed by a slower diffusion phase as the particle diffuses out of the encapsulated coating and the solution inside the coating becomes less concentrated with time. The equation used for first-order kinetics is shown as equation (3), where $M_r$ is the amount of particle remaining at time t; $M_0$ is the total amount of particle before dissolution; $k_1$ is the first-order release constant; and t is time.

$$\frac{M_r}{M_0} = k_h t^{1/2} \quad (3)$$

Figure 31:
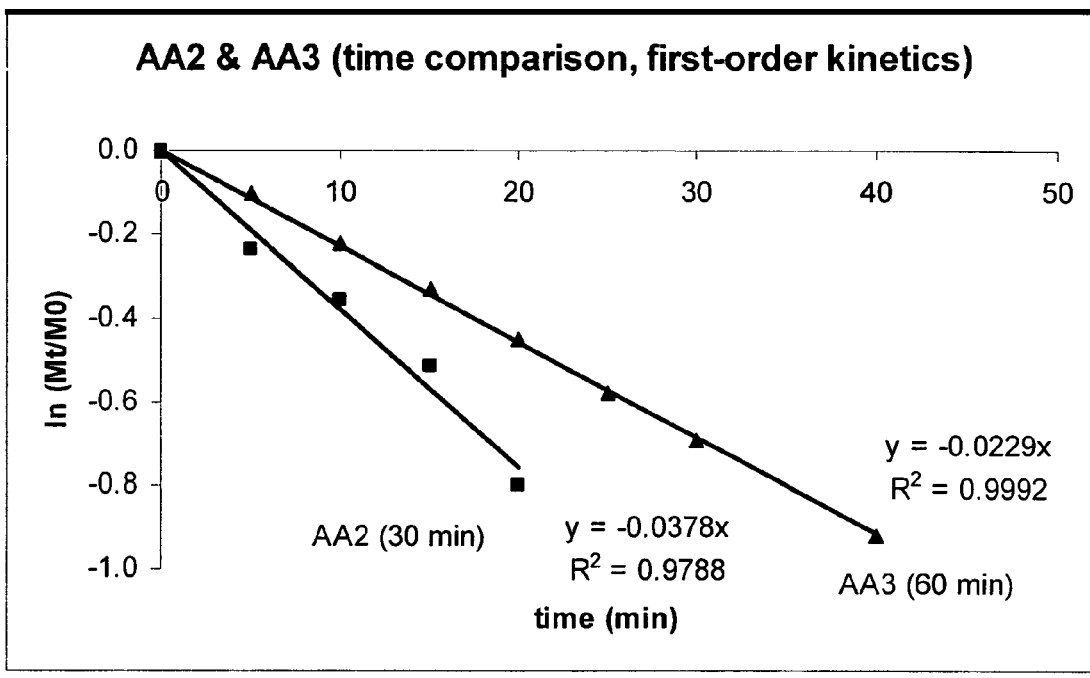
FIG. 31 depicts first-order release kinetics of acetylsalicylic acid coated with polyallyl alcohol as a function of coating time.
Figure 32:
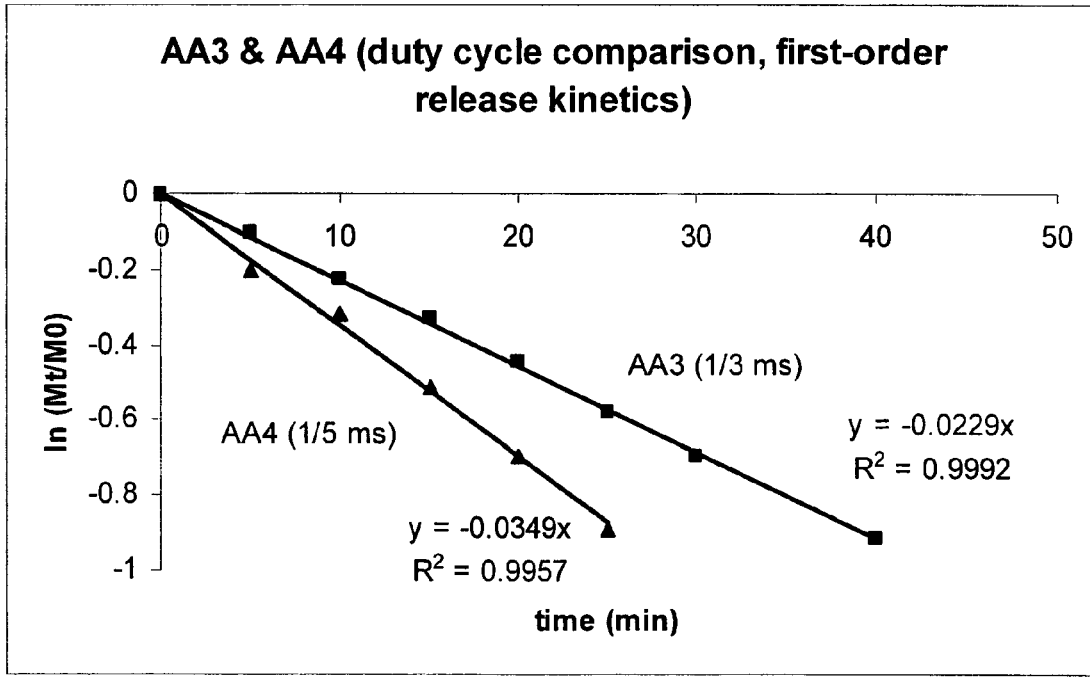
FIG. 32 depicts first-order release kinetics of acetylsalicylic acid coated with polyallylalcohol as a function of plasma duty cycle.

First-order kinetic data for acetylsalicylic acid crystal particles coated with polyallyl alcohol are shown in FIGS. 30-32, which included data for the release of 60% of the total particles. The R values for FIGS. 27-29, were 0.9992, 0.9957, 0.9975 and 0.9788.

The above figures indicate that particle release rates are more in accord with first-order rather than zero-order kinetics. The first-order rate constants were 0.12 to 0.0054 min$^{-1}$, representing a factor in excess of 20 for the variation of release rates.

The data also show that there is room for further control of release rates, for example, by using longer coating time periods, possibly in combination with other reaction conditions, such as higher power inputs. While all potential possibilities for altering reaction conditions are not presented, the possibilities are obvious to one of ordinary skill in the art.

Kinetic analyses were similarly performed for particles of acetylsalicylic acid crystals coated with a polymer film of polymethyl methacrylate or polyperfluorohexane. With these coatings, particle release also appeared to involve first-order rather than zero-order kinetics. TABLE 9 summarized some of the analyses.

TABLE 9

Kinetic analyses for acetylsalicylic acid coated with polyperfluorohexane (AP) or polymethylmethacrylate (AM).

| | Zero-order kinetics | | First-order kinetics | |
| --- | --- | --- | --- | --- |
| Run | k (min$^{-1}$) | $R^2$ | k (min$^{-1}$) | $R^2$ |
| AP3(1) | 0.009 | 0.3994 | 0.012 | 0.7134 |
| AP3(2) | 0.004 | 0.8137 | 0.006 | 0.9402 |
| AP3(3) | 0.003 | 0.9784 | 0.004 | 0.9949 |
| AP3(4) | 0.001 | 0.962 | 0.002 | 0.9896 |
| AP1 | 0.002 | 0.9636 | 0.003 | 0.9905 |
| AP2 | 0.002 | 0.9719 | 0.002 | 0.9895 |
| AM1 | 0.017 | 0.9787 | 0.024 | 0.9973 |
| AM2 | 0.010 | 0.9613 | 0.014 | 0.998 |
| AM3 | 0.007 | 0.9779 | 0.009 | 0.997 |
| AM4 | 0.003 | 0.9903 | 0.004 | 0.9951 |

Figure 33:
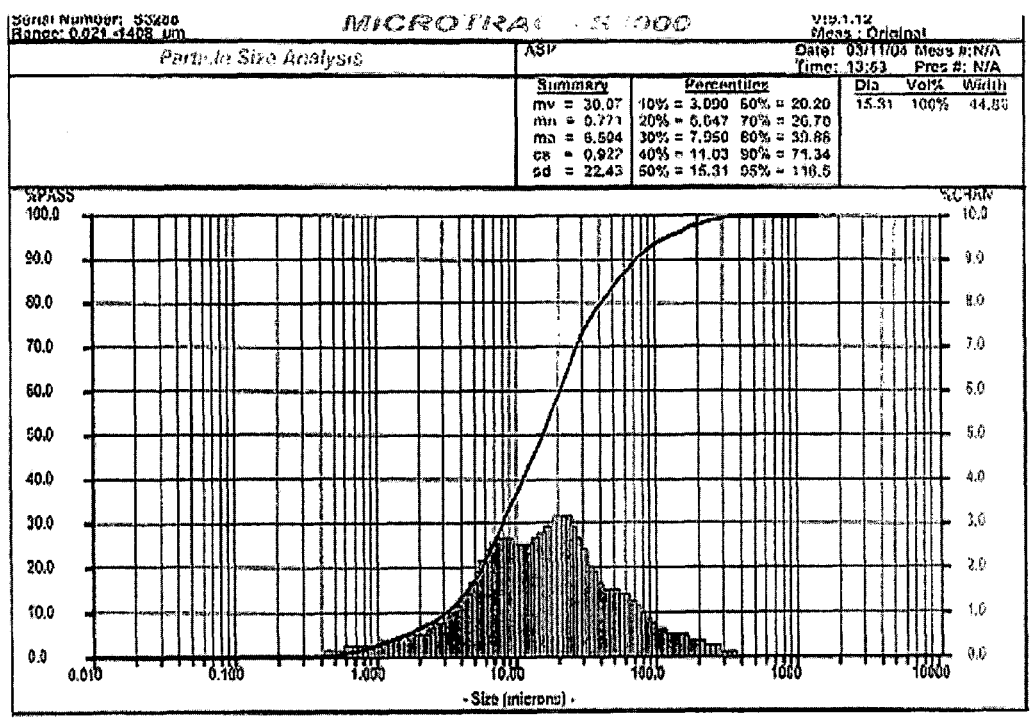
FIG. 33 depicts light scattering of acetylsalicylic acid in accordance with one aspect of the present invention.

Light scattering measurements for particles of acetylsalicylic acid molecules are shown in FIG. 33. The results are based on conditions that included sieving particles through a 35 μm mesh. FIG. 33, shows that the particles varied in size, ranging, on average, from 10 and 20 μm. More or less uniform particles may also be used with the present invention.

The present invention shows that deposition of a polymer film or coating using plasma polymerization is a new and improved way to introduce and control the release of a particle into an environment. Using systems, methods, and compositions of the present invention, one can prepare any encapsulated particle coated with any degradable and/or nondegradable polymer and alter particle release rates to control particle introduction into an environment. The control of particle introduction into the environment may be a temporal and/or site-specific control. For example, polymer film deposition may be controlled by altering reaction conditions, such as power input, peak power, coating time, duty cycle, flow rate of the carbonaceous compound, reactor pressure, and/or quantity of particles during preparation of the coated particles. These conditions control aspects of the coating or polymer film, including polymer film growth, polymer film thickness, the density of polar groups in the polymer film, the number of functional groups in the polymer film, the hydrophilicity or hydrophobicity of the polymer film, wettability of the polymer film, linearity of the polymer film, and extent of cross-linkages in the polymer. In this way, a polymer film of the present invention may be finely tuned in order to obtain any required combination of temporal and/or site-specific release of particles into an environment.

The present invention also provides for compositions prepared by systems and methods described herein. Such compositions, systems, and/or methods may include one or more carbonaceous compounds as well as one or more different types of particles. Indeed, such variations may be specifically manufactured to optimally control release of one or more particles into an environment. Optimally control may include combining particles with similar or different coatings, wherein the differences include the coating composition, thickness, number and/or type of functional group, hydrophobicity, hydrophilicity, wettability, linearity, cross-linking, and combinations thereof. With the present invention, one or more different compositions may also be combined to yield a desired particle release property.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawing.

What is claimed:

1. Encapsulated particles comprising
   one or more constituents disposed in a duty cycle tuned cross-linked polymeric coating to form the encapsulated particles wherein the one or more constituents are released from the encapsulated particles when the encapsulated particles are placed in a target environment,
   wherein the duty cycle tuned cross-linked polymeric coating provides a controlled release of the one or more constituents from the encapsulated particles in the target environment;
   wherein the encapsulated particles are formed by the method comprising:
      placing particles in a reaction chamber of a plasma reactor;
      supplying a carbonaceous composition to the reaction chamber;
      forming a cross-linked polymeric coating on one or more of the particles by plasma enhanced chemical vapor deposition of the carbonaceous composition under predetermined reaction conditions, wherein the predetermined reaction conditions comprise a predetermined duty cycle, power input, and coating time that is selected to provide a desired amount of cross-linking to the polymeric coating;
   wherein the cross-linked polymeric coating provides a desired controlled release profile of the one or more constituents from the encapsulated particles.

2. The particle of claim 1, wherein the cross-linked polymeric coating is degradable.

3. The particle of claim 1, wherein the cross-linked polymeric coating is degradable by enzymatic cleavage.

4. The particle of claim 1, wherein the cross-linked polymeric coating is degradable by erosion.

5. The particle of claim 1, wherein the cross-linked polymeric coating is nondegradable in the target environment, and wherein one or more constituents of the encapsulated particles are released through pores formed in the polymeric coating when the encapsulated particles are introduced into the target environment.

6. The particles of claim 1, wherein the polymeric coating is free of pin-hole defects.

7. The particles of claim 1, wherein the cross-linked polymeric coating has a thickness of less than 1 micron.

8. The particle of claim 1, wherein the cross-linked polymeric coating is hydrophobic.

9. The particle of claim 1, wherein the cross-linked polymeric coating is hydrophilic.

10. The particle of claim 1, wherein the particle comprises a pharmaceutical agent.

11. The particle of claim 1, wherein the particle comprises a protein.

12. The particle of claim 1, wherein the particle comprises a nucleic acid.

13. The particle of claim 1, wherein the particles are crystalline particles comprising a single constituent.

14. The particles of claim 1, wherein the particles have a particle size of between about 1 micron to about 100 microns.

15. The particle of claim 1, wherein the predetermined reaction conditions comprises a peak power between about 25 W and 100 W.

* * * * *